(12) United States Patent
Song et al.

(10) Patent No.: US 12,340,944 B2
(45) Date of Patent: Jun. 24, 2025

(54) MULTILAYER ELECTRONIC COMPONENT

(71) Applicant: SAMSUNG ELECTRO-MECHANICS CO., LTD., Suwon-si (KR)

(72) Inventors: Jun Il Song, Suwon-si (KR); Byung Woo Han, Suwon-si (KR); Do Hoon Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 107 days.

(21) Appl. No.: 17/960,177

(22) Filed: Oct. 5, 2022

(65) Prior Publication Data

US 2023/0260706 A1 Aug. 17, 2023

(30) Foreign Application Priority Data

Feb. 11, 2022 (KR) .................. 10-2022-0018034

(51) Int. Cl.
| | |
|---|---|
| *H01G 4/232* | (2006.01) |
| *H01G 4/12* | (2006.01) |
| *H01G 4/30* | (2006.01) |
| *H01G 4/40* | (2006.01) |

(52) U.S. Cl.
CPC .............. *H01G 4/232* (2013.01); *H01G 4/12* (2013.01); *H01G 4/30* (2013.01); *H01G 4/40* (2013.01)

(58) Field of Classification Search
CPC ............ H01G 4/232; H01G 4/12; H01G 4/30; H01G 4/248; H01G 4/228; H01G 4/40

USPC .......... 361/301.4, 321.1, 321.3, 306.3, 321.2
See application file for complete search history.

(56) References Cited

U.S. PATENT DOCUMENTS

| | | | |
|---|---|---|---|
| 2007/0128794 A1* | 6/2007 | Kusano | ............... H01G 4/2325 257/314 |
| 2009/0154055 A1* | 6/2009 | Takashima | ............... H01G 4/30 361/301.4 |
| 2016/0027584 A1 | 1/2016 | Hattori | |

(Continued)

FOREIGN PATENT DOCUMENTS

| | | |
|---|---|---|
| JP | 2016-25301 A | 2/2016 |
| KR | 10-2019-0116127 A | 10/2019 |

(Continued)

*Primary Examiner* — Arun Ramaswamy
(74) *Attorney, Agent, or Firm* — Morgan Lewis & Bockius LLP

(57) ABSTRACT

A multilayer electronic component, includes: a body including a stack portion having a dielectric layer and an internal electrode disposed in a first direction, a connection electrode disposed on an end surface of the stack portion in a second direction, to be connected to the internal electrode, and an insulating layer covering the connection electrode, the body having opposing first and second surfaces in the first direction, opposing third and fourth surfaces in the second direction, and opposing fifth and sixth surfaces in a third direction; and an external electrode connected to the connection electrode. The connection electrode includes a body portion in contact with one end of the internal electrode in the second direction, and one or more of first lead portions extending from the body portion to be in contact with one or more of the first surface, the second surface, the fifth surface, and the sixth surface.

25 Claims, 18 Drawing Sheets

(56) References Cited

U.S. PATENT DOCUMENTS

| | | | |
|---|---|---|---|
| 2016/0086734 A1* | 3/2016 | Park | H01G 4/0085 |
| | | | 361/301.4 |
| 2016/0088725 A1* | 3/2016 | Park | H01G 4/30 |
| | | | 361/301.4 |
| 2018/0019064 A1* | 1/2018 | Han | H01G 4/30 |
| 2018/0190433 A1* | 7/2018 | Cho | H01G 4/012 |
| 2019/0066923 A1* | 2/2019 | Jung | H01G 4/008 |
| 2020/0006004 A1 | 1/2020 | Kojima et al. | |
| 2021/0005383 A1* | 1/2021 | Park | H01G 4/224 |
| 2021/0020377 A1* | 1/2021 | Kurosu | H01G 4/012 |

FOREIGN PATENT DOCUMENTS

| | | |
|---|---|---|
| KR | 10-2057913 B1 | 12/2019 |
| KR | 10-2292922 B1 | 8/2021 |

* cited by examiner

MULTILAYER ELECTRONIC COMPONENT

CROSS-REFERENCE TO RELATED APPLICATION(S)

This application claims benefit of priority to Korean Patent Application No. 10-2022-0018034 filed on Feb. 11, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of any of various electronic products, such as an imaging device, including a liquid crystal display (LCD) or a plasma display panel (PDP), a computer, a smartphone, or a mobile phone, serving to charge or discharge electricity therein or therefrom.

The multilayer ceramic capacitor has a small size, implements high capacitance, and is easily mounted on a circuit board, and may thus be used as a component of various electronic devices. There has been increasing demand for such a multilayer ceramic capacitor to have a smaller size and higher capacitance as various types of electronic devices such as a computer and a mobile device have a smaller size and higher output.

In addition, in recent years, as industry interest in electronic products has increased, multilayer ceramic capacitors have been required to have high reliability characteristics to be used in automobiles and infotainment systems.

The multilayer electronic component such as a general multi aver ceramic capacitor may include a capacitance formation portion realizing capacitance, and a margin portion at one end of internal electrodes to connect each of the internal electrodes to terminal electrodes having different polarities.

Since the margin portion is a configuration that does not contribute to capacitance formation, it is necessary to reduce a volume occupied by the margin portion in order to improve capacitance per unit volume the multilayer electronic component.

However, when the volume occupied by the margin portion is reduced, a path of external moisture permeation may also be shortened, which may cause a problem in that moisture resistance reliability of the multilayer electronic component may be deteriorated.

Accordingly, there is a need for improvement in a structure of the internal electrode and the external electrode of the multilayer electronic component so as to improve the moisture-resistance reliability thereof while minimizing the volume occupied by the margin portion.

SUMMARY

An aspect of the present disclosure is to solve a problem in which a volume occupied by a capacitance formation portion of a multilayer electronic component is reduced, when a first internal electrode and a second internal electrode from each other, and a margin portion in a length direction is formed in order to connect the internal electrodes to terminal electrodes having different polarities.

An aspect of the present disclosure is to solve a problem in which moisture-resistance reliability deteriorates due to a decrease in a path for external moisture permeation when a volume of a margin portion in a length direction is reduced in order to increase a volume of a capacitance formation portion.

However, the object of the present disclosure is not limited to the above, and will be more easily understood in a process of describing specific embodiments of the present disclosure.

According to an aspect of the present disclosure, a multilayer electronic component, includes: a body including a stack portion in which a dielectric layer and an internal electrode are alternately disposed in a first direction, a connection electrode disposed on an end surface of the stack portion in a second direction, perpendicular to the first direction, to be connected to the internal electrode, and an insulating layer disposed to cover an end surface of the connection electrode in the second direction, the body having first and second surfaces opposing each other in the first direction, third and fourth surfaces connected to the first and second surfaces and opposing each other in the second direction, and fifth and sixth surfaces connected to the first to fourth surfaces and opposing each other in a third direction; and an external electrode disposed on the body and connected to the connection electrode. The connection electrode includes a body portion disposed to be in contact with one end of the internal electrode in the second direction in the end surface of the stack portion in the second direction. The connection electrode further includes at least one of a first lead portion extending from the body portion to be in contact with the first surface, a second lead portion extending from the body portion to be in contact with the second surface, a third lead portion extending from the body portion to be in contact with the fifth surface, and a fourth lead portion extending from the body portion to be in contact with the sixth surface.

According to an aspect of the present disclosure, a multilayer electronic component includes: a body including a stack portion in which a dielectric layer and an internal electrode are alternately disposed in a first direction, a connection electrode disposed on an end surface of the stack portion in a second direction, perpendicular to the first direction, to be connected to the internal electrode, and an insulating layer disposed to cover an end surface of the connection electrode in the second direction, the body having first and second surfaces opposing each other in the first direction, third and fourth surfaces connected to the first and second surfaces and opposing each other in the second direction, and fifth and sixth surfaces connected to the first to fourth surfaces and opposing each other in a third direction; and an external electrode disposed on the body and connected to the connection electrode. The connection electrode includes a plurality of body portions in contact with one end of the internal electrode in the second direction in an end surface of the stack portion in the second direction and spaced apart from each other, and one or more of lead portions extending from one or more of the plurality of body portions to be in contact with at least one of the first, second, fifth, and sixth surfaces.

According to an aspect of the present disclosure, a multilayer electronic component includes: a body including a first internal electrode, a dielectric layer, and a second internal electrode disposed in a first direction of the body, a first connection electrode connected to the first internal electrode, a first insulating layer covering the first connection electrode, a second connection electrode connected to the second internal electrode, and a second insulating layer covering the second connection electrode; and a first external electrode disposed on the body to connect to the first connection electrode and a second external electrode disposed on the body to connect to the second connection electrode. The first connection electrode includes a first body portion in contact with one end of the first internal electrode in a second direction perpendicular to the first direction, and a first lead portion extending from the first body portion to be in contact with one of the first surface, the second surface, the fifth surface, and the sixth surface. The second connection electrode includes a second body portion in contact with one end of the second internal electrode in the second direction, and a second lead portion extending from the body portion to be in contact with the one of the first surface, the second surface, the fifth surface, and the sixth surface. In a cross section of the body in the second direction of the body, the first connection electrode is spaced apart from corners of cross section.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
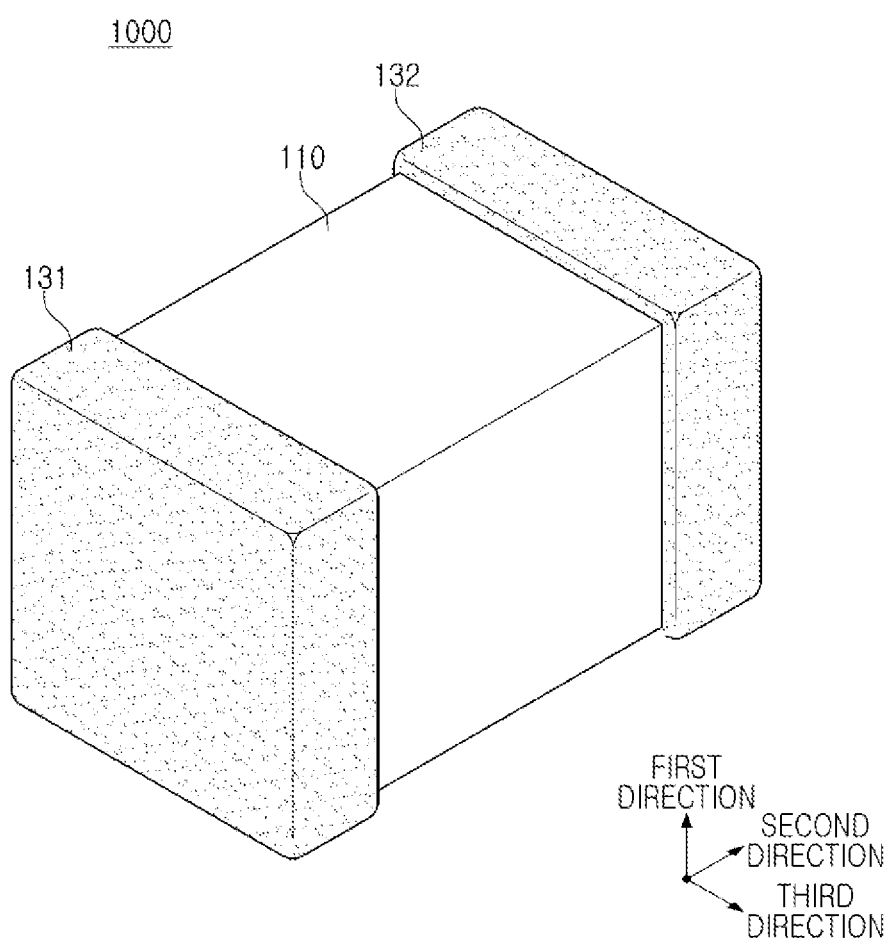
FIG. 1 a perspective view schematically illustrating a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, certain elements may be omitted to clearly illustrate the present disclosure, and to clearly express a plurality of layers and areas, thicknesses may be magnified. The same elements having the same function within the scope of the same concept will be described using the same reference numeral. Further, throughout the specification, it will be understood that when a portion "includes" an element, it can further include another element, not excluding another element, unless otherwise indicated.

In the drawings, a first direction may refer to a stacking direction or a thickness (T) direction, a second direction may refer to a length (L) direction, and a third direction may refer to a width (W) direction.

FIG. 1 is a perspective view schematically illustrating a multilayer electronic component according to an embodiment of the present disclosure.

Figure 2:
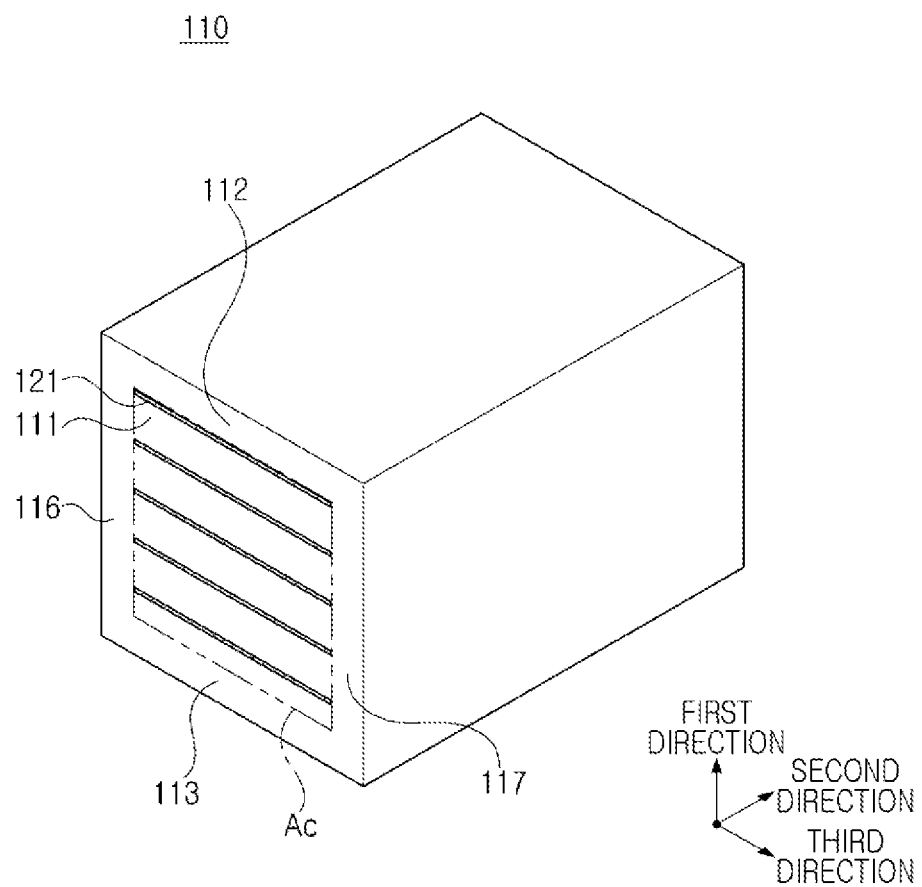
FIG. 2 is a perspective view schematically illustrating a stack portion of a multilayer electronic component according to an embodiment of the present disclosure.

FIG. 2 is a perspective view schematically illustrating a stack portion of a multilayer electronic component according to an embodiment of the present disclosure.

Figure 3:
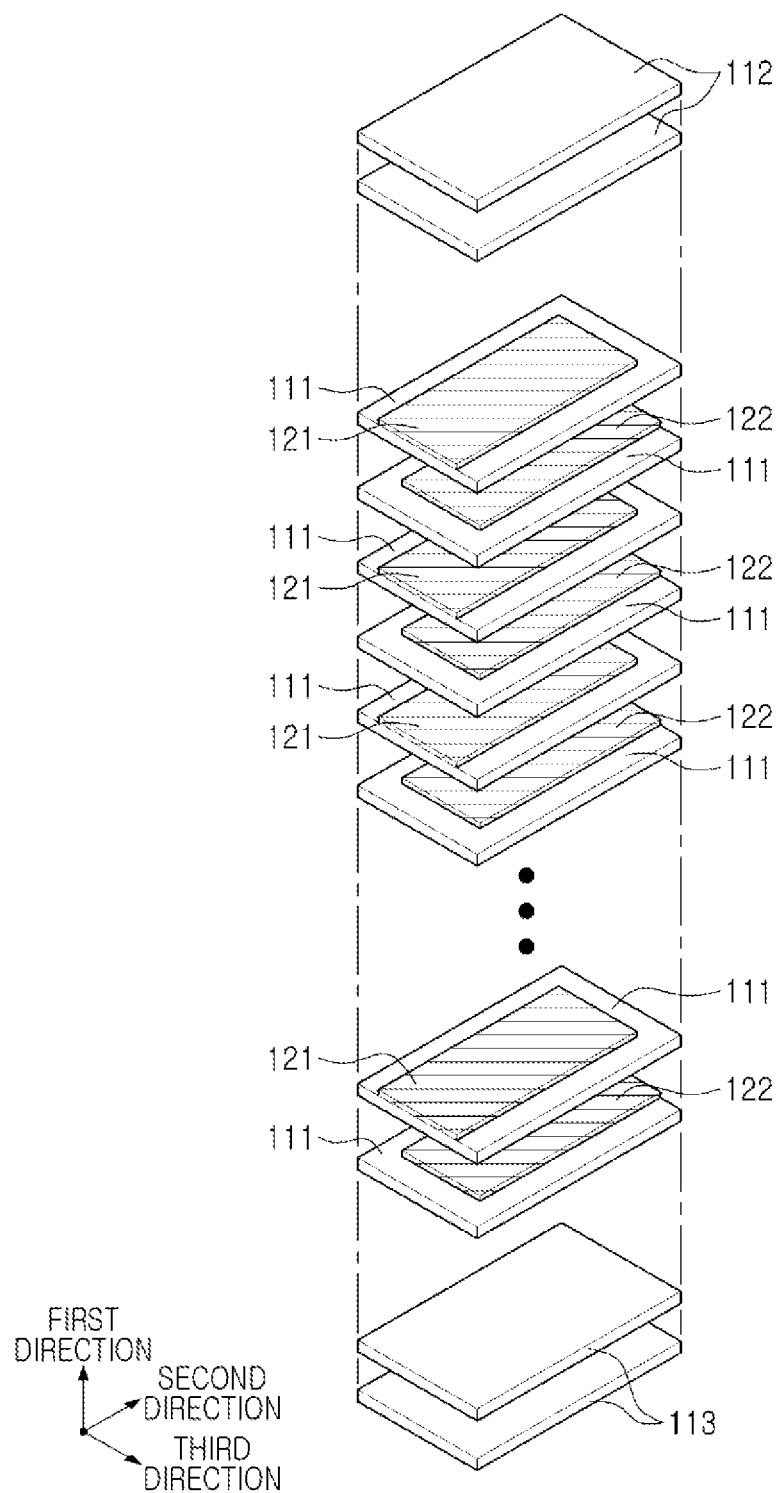
FIG. 3 is an exploded perspective view schematically illustrating the stack portion of FIG. 2 through disassembling the same.

FIG. 3 is an exploded perspective view schematically illustrating the stack portion of FIG. 2 through disassembling the same.

Figure 4:
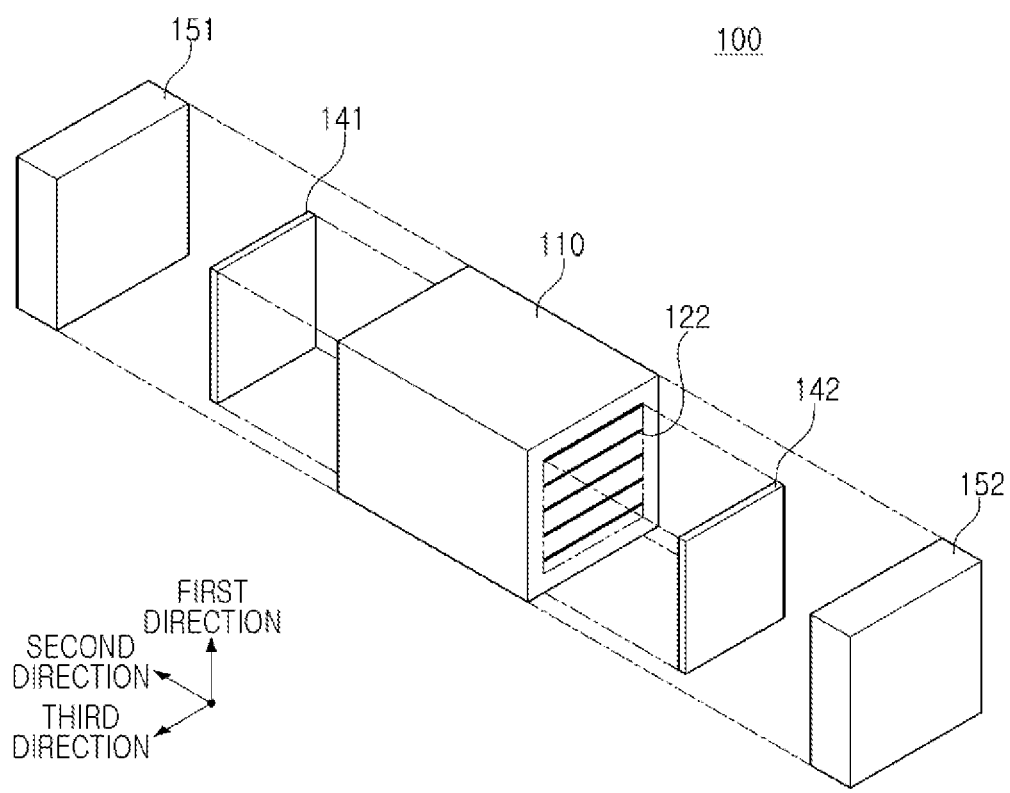
FIG. 4 is an exploded perspective view schematically illustrating a body of a multilayer electronic component according to an embodiment of the present disclosure.

FIG. 4 is an exploded perspective view schematically illustrating a body of a multilayer electronic component according to an embodiment of the present disclosure.

Figure 5:
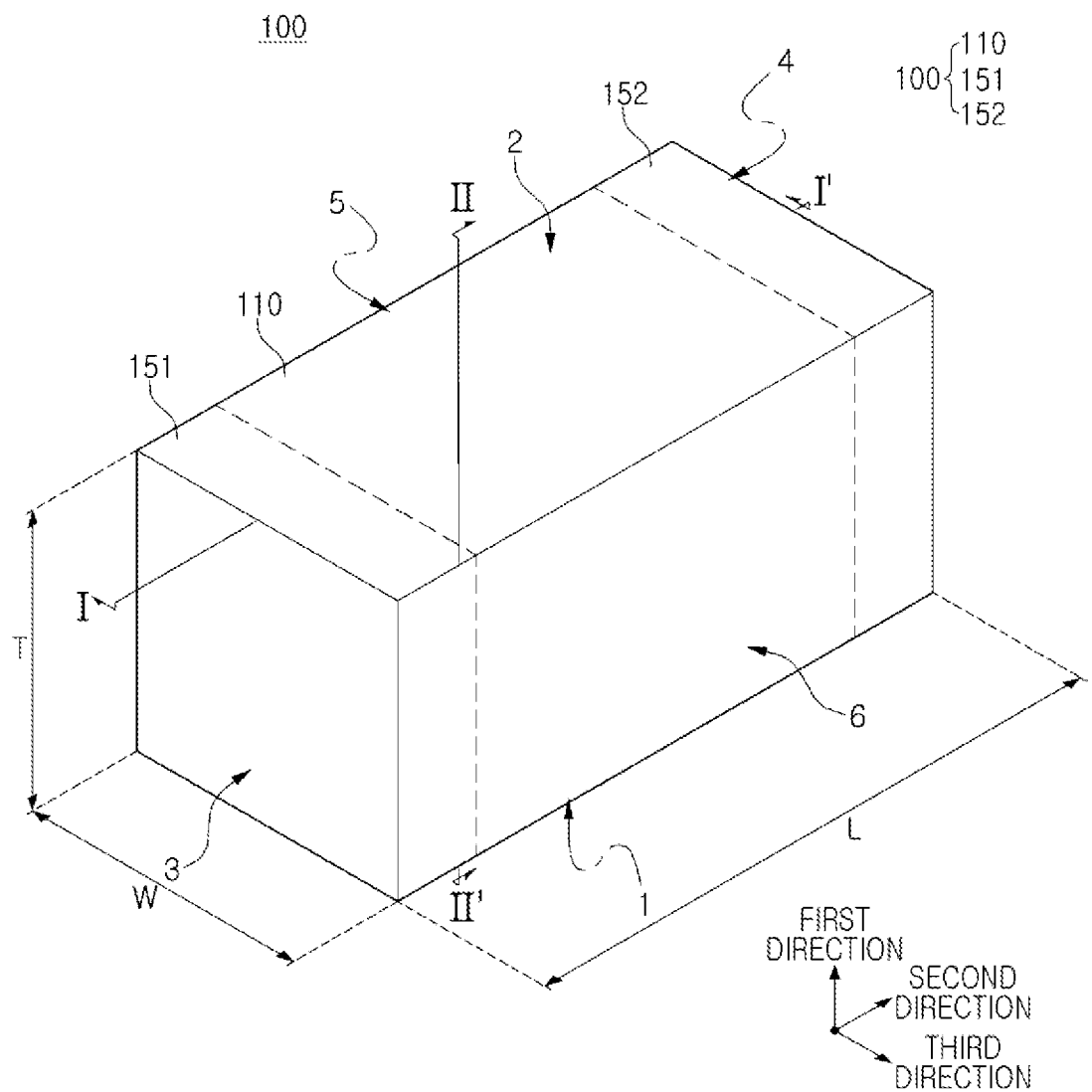
FIG. 5 is a perspective view schematically illustrating a body of a multilayer electronic component according to an embodiment of the present disclosure.

FIG. 5 is a perspective view schematically illustrating a body of a multilayer electronic component according to an embodiment of the present disclosure.

Figure 6:
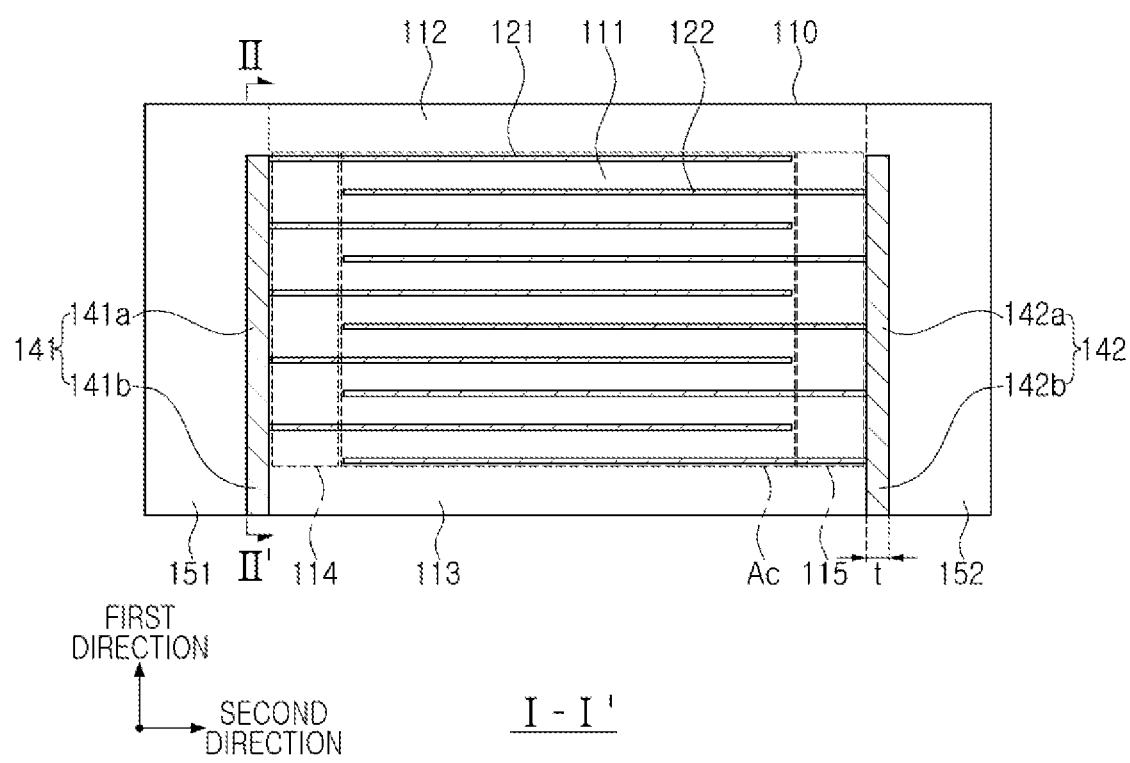
FIG. 6 is a cross-sectional view taken along line I-I' of FIG. 5.

FIG. 6 is a cross-sectional view taken along line I-I' of FIG. 5.

Hereinafter, a multilayer electronic component according to an embodiment of the present disclosure will be described with reference to FIGS. 1 to 6.

According to an embodiment of the present disclosure, a multilayer electronic component may include: a body 100 including a stack portion 110 in which a dielectric layer 111 and an internal electrode 121/122 are alternately disposed in a first direction, a connection electrode 141/142 disposed on both ends of the stack portion in a second direction, perpendicular to the first direction, and an insulating layer 151/152 disposed to cover an end surface of the connection electrode 141/142 in the second direction, the body 100 having first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1 to 4 and opposing each other in a third direction; and an external electrode 131/132 disposed on the body 100 and connected to the connection electrode 141/142. The connection electrode 141/142 may include a body portion 141a/142a disposed to be in contact with one end of the internal electrode 121/122 in the second direction in an end surface of the stack portion 110 in the second direction, and a lead portion 141b/142b disposed to extend from the body portion 141a/142a to be in contact with any one of the first, second, fifth, and sixth surfaces 1, 2, 5, and 6.

In an embodiment, the body 100 may include a stack portion 110, connection electrodes 141 and 142 disposed on both ends of the stack portion in a second direction, perpendicular to the first direction, and insulating layers 151 and 152 disposed to respectively cover end surfaces of the connection electrodes 141 and 142 in the second direction.

The body 100 is not limited to a particular shape, and may have a hexahedral shape or a shape similar to the hexahedral shape, as illustrated in the drawings. The body 100 may not have a hexahedral shape having perfectly straight lines because ceramic powder particles included in the body 100 may be contracted in a process in which the body is sintered. However, the body 100 may have a substantially hexahedral shape.

The body 100 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4 and opposing each other in a third direction.

In an embodiment, the stack portion 110 may include a dielectric layer 111 and internal electrodes 121 and 122, and in the stack portion 110, the dielectric layer 111 and the internal electrodes 121 and 122 may be alternate disposed in a first direction. The plurality of dielectric layers 111 forming the stack portion 110 are in a sintered state, and a boundary between adjacent dielectric layers 111 may be integrated, such that it may be difficult to confirm without using a scanning electron microscope (SEM).

A raw material of the dielectric layer 111 is not particularly limited as long as sufficient capacitance may be obtained therewith. For example, a barium titanate-based material, a lead composite perovskite-based material, a strontium titanate-based material, or the like, may be used as the raw material of the dielectric layer 111. The barium titanate-based material may include $BaTiO_3$-based ceramic powder particles. Examples of the $BaTiO_3$-based ceramic powder particles may include $BaTiO_3$ and $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$ and $0<y<1$), $Ba(Ti_{1-y}Ca_y)O_3$ ($0<y<1$), or the like, in which calcium (Ca), zirconium (Zr), or the like, is partially solid-dissolved in $BaTiO_3$.

In addition, a raw material of the dielectric layer 111 may include various ceramic additives, organic solvents, binders, dispersants, and the like, added to powder particles such as barium titanate ($BaTiO_3$) powder particles, or the like, according to an object of the present disclosure.

The internal electrodes 121 and 122 are alternately stacked with the dielectric layer 111.

The internal electrodes 121 and 122 may include a first internal electrode 121 and a second internal electrode 122. The first and second internal electrodes 121 and 122 may be alternately disposed to face each other with the dielectric layer 111 forming the stack portion 110 interposed therebetween, and the first internal electrode 121 may be exposed to one end surface of the stack portion 110 in the second direction, and the second internal electrode 122 may be exposed to the other end surface of the stack portion 110 in the second direction.

Referring to FIG. 6, the first internal electrode 121 may be disposed to be spaced apart from the other end surface of the stack portion 110 in the second direction by a predetermined distance, and the second internal electrode 122 may be disposed to be spaced apart from one end surface of the stack portion 110 in the second direction by a predetermined distance. In this case, the first and second internal electrodes 121 and 122 may be electrically isolated from each other by the dielectric lever 111 disposed in a middle.

The stack portion 110 may be formed by alternately stacking a ceramic green sheet on which the first internal electrode 121 is printed and a ceramic green sheet on which the second internal electrode 122 is printed, followed by sintering.

A material for forming the internal electrodes 121 and 122 is not particularly limited, and a material having excellent electrical conductivity may be used therefor. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for the internal electrodes including at least one of nickel (Ni), copper (Cu), palladium (Pd), silver Ag), gold (Au), platinum (Pt), tin (Sn), tungsten (W), titanium (Ti) and an alloy thereof on a ceramic green sheet. A method for printing the conductive paste for the internal electrodes may be a screen-printing method or a gravure printing method, but the present disclosure is not limited thereto.

The stack portion 110 may include a capacitance formation portion Ac, disposed in the stack portion 110 and including a first internal electrode 121 and a second internal electrode 122 disposed to oppose each other with the dielectric layer interposed therebetween to form capacitance, and cover portions 112 and 113, disposed on one surface and the other surface of the capacitance formation portion Ac in the first direction.

The cover portions 112 and 113 may include an upper cover portion 112 disposed on an upper surface of the capacitance formation portion Ac in the first direction, and a lower cover portion 113 disposed on a lower surface of the capacitance formation portion Ac in the first direction.

The upper cover portion 112 and the lower cover portion 113 may be formed by laminating a single dielectric layer or two or more dielectric layers on the upper and lower surfaces of the capacitance formation portion Ac, respectively, in the thickness direction, and may basically serve to prevent damage to the internal electrodes caused by physical or chemical stress.

The upper cover portion 112 and the lower cover portion 113 may not include internal electrodes, and may include the same material as the dielectric layer 111.

Alternatively, the upper cover portion 112 and the lower cover portion 113 may not include a ceramic material such as a barium titanate ($BaTiO_3$)-based ceramic material.

In addition, the stack portion 110 may include margin portions 114 and 115 in a second direction disposed on one surface and the other surface of the capacitance formation portion Ac in a second direction (length direction).

The margin portions 114 and 115 in the second direction may mean a region between both ends of the first and second internal electrodes 121 and 122 in the second direction and end surfaces of the stack portion 110 in the second direction, as illustrated in FIG. 6.

The margin portion 114 in the second direction may serve to connect the first internal electrode 121 and the margin portion 115 in the second direction may serve to connect the second internal electrode 122 to power sources having different polarities, respectively. Meanwhile, since the margin portion 114 or 115 in the second direction includes one of the first internal electrode 121 and the second internal electrode 122 and a dielectric layer 111, it does not contribute to capacitance formation, and since the margin portion 114 or 115 in the second direction includes the first or second internal electrode 121 or 122 exposed to the end surface of the stack portion 110, it may be a permeation path of external moisture.

In the conventional multilayer electronic component, in order to connect each of the first inner electrode 121 and the second inner electrode 122 to terminal electrodes of different polarities, the first and second internal electrodes and the terminal electrodes were in contact with each other on both end surfaces of the stack portion 110 in the second direction to be electrically connected.

In this case, in order to increase capacitance per unit volume of the multilayer electronic component, it is necessary to minimize a length of a margin portion in the second direction (length direction) that does not contribute to capacitance formation. However, the length of the margin portion in the second direction decreases, a path of external moisture permeation becomes shorter, so that moisture-resistance reliability may be weakened.

In addition, since a margin portion in the second direction is formed by stacking any one of the first and second internal electrodes and a dielectric layer, an end of the margin portion in the second direction may be bent during a compression process. Accordingly, since an end of the dielectric layer 111 in the second direction becomes thin, withstand voltage characteristics of the multilayer electronic component may be weakened.

In addition, margin portions 116 and 117 in a third direction may be disposed on one surface and the other surface of the capacitance formation portion Ac in a third direction (width direction).

Margin portions 116 and 117 in the third direction may be disposed on both end surfaces of the stack portion in the width direction.

As illustrated in FIG. 2, the margin portions 116 and 117 in the third direction may refer to a region between both ends of the first and second internal electrodes 121 and 122 in the third direction and a boundary surface of the stack portion 110, on both end surfaces of the stack portion in the second direction.

The margin portions 116 and 117 in the third direction may basically serve to prevent damage to the internal electrode due to physical stress or chemical stress.

The margin portions 116 and 117 in the third direction may be formed by applying a conductive paste to ceramic green sheets, except for places in which the margin portions are to be formed to form the internal electrodes.

In addition, in order to suppress a step by the internal electrodes 121 and 122, after the internal electrodes are cut so as to be exposed to the fifth and sixth surfaces 5 and 6 of the body after lamination, the margin portions 114 and 115 may also be formed by laminating a single dielectric layer or two or more dielectric layers on both side surfaces of the capacitance formation portion Ac in the third direction (width direction).

The connection electrodes 141 and 142 may be disposed on both ends of the stack portion 110 in a second direction, perpendicular to the first direction, and connected to the internal electrodes 121 and 122.

Specifically, the connection electrodes 141 and 142 may include a first connection electrode 141 disposed on one end surface of the stack portion 110 in a second direction to be connected to the first internal electrode 121, and a second connection electrode 142 disposed on the other end surface of the stack portion 110 in a second direction to be connected to the second internal electrode 122.

The connection electrodes 141 and 142 may include body portions 141*a* and 142*a* disposed to be in contact with one ends of the internal electrodes 121 and 122 on the end surface of the stack portion 110 in the second direction, and lead portions 141*b* and 142*b* disposed to extend from the body portions 141*a* and 142*a* to be in contact with at least one of the first, second, fifth, and sixth surfaces.

The body portions 141*a* and 142*a* may be in contact with one ends the internal electrodes 121 and 122 in the second direction to serve to electrically connect the connection electrodes 141 and 142 to the internal electrodes 121 and 122.

Specifically, the body portion 141*a* may be in contact with one end of a first internal electrode 121 in the second direction, the body portion 142*a* may be in contact with one end of a second internal electrode 122 in the second direction, the body portion 141*a* may not be in contact with the second internal electrode 122, and the body portion 142*a* may not be in contact with the first internal electrode 121. Accordingly, the first internal electrode 121 may be electrically connected to the connection electrode 141, and the second internal electrode 122 may be electrically connected to the connection electrode 142. In this case, in order to maximize capacitance, it is preferable that all of the first internal electrodes 121 are in contact with the body portion 141*a* and all of the second internal electrodes 122 are in contact with the body portion 142*a*.

In an embodiment, the body portions 141*a* and 142*a* may be disposed to completely cover one ends of the internal electrode 121 and 122 in the second direction. Accordingly, connectivity between the internal electrodes 121 and 122 and the connection electrodes 141 and 142 may be maximized. Specifically, the body portion 141*a* of the first connection electrode 141 may be disposed to completely cover one end of the first internal electrode 121 in the second direction, and the body portion 142*a* of the second internal electrode 142 may be disposed to completely cover one end of the second internal electrode 122 in the second direction.

Lead portions 141*b* and 142*b* may be disposed to extend from the body portions 141*a* and 142*a* to be in contact with at least one surface of the first, second, fifth, and sixth surfaces.

The lead portions 141*b* and 142*b* serve to electrically connect the connection electrodes 141 and 142 to the external electrodes 131 and 132. That the lead portions 141*b* and 142*b* may be in contact with the external electrodes 131 and 132 on one or more surfaces of the body 100 to be connected to the external electrodes 131 and 132. The lead portions 141*b* and 142*b* may be disposed to extend from the body portions 141*a* and 142*a* in the first direction or the third direction.

In addition, the number of lead portions 141*b* and 142*b* may serve to reduce a path of permeation of external moisture depending on the shape and composition thereof. Since the lead portions 141*b* and 142*b* are in contact with the external electrodes 131 and 132 on a specific surface of the body 100, the lead portions 141*b* and 142*b* may be a main path for moisture permeation. In this case, when a width of the lead portions 141*b* and 142*b*, in contact with a specific surface of the body 100, is adjusted, or a width of the lead portions 141*b* and 142*b* is formed to have a narrower width than the body portions 141*a* and 142*a*, is possible to suppress permeation moisture into the region in which the lead portions 141*b* and 142*b* are in contact with a specific surface of the body, and even if the moisture permeates, it is possible to suppress transmission to the body portions 141a and 142a.

In addition, since the lead portions 141b and 142b may be in contact with at least one of the first to sixth surfaces 1, 2, 3, 4, 5, and 6 of the body 100, the lead portions 141b and 142b may serve to implement a product that can have various mounting directions according to design convenience and user selection.

The connection electrodes 141 and 142 may be formed by printing a conductive paste on one surface of the insulating layers 151 and 152 and then bonding to be disposed at both ends of the stack portion 110 in the second direction.

A method of printing the connection electrodes 141 and 142 on the insulating layers 151 and 152 may vary depending on the purpose. For example, when the connection electrodes 141 and 142 of various and complex shapes need to be printed, the connection electrodes 141 and 142 may be formed by screen-printing, but the present disclosure is not limited thereto.

When the connection electrodes 141 and 142 are printed on one surface of the insulating layers 151 and 152 and then coupled to the staking portion 110 according to an embodiment, damage to the internal electrodes may be minimized even when a plurality of body portions 141a" to be described later are formed and the internal electrodes are connected thereto, and the connection electrodes 141 and 142 may be formed in various shapes, thereby improving a degree of design freedom.

A thickness of the connection electrodes 141 and 142 is not particularly limited. However, in order to improve connectivity with the internal electrodes 121 and 122, an average thickness t of the connection electrodes 141 and 142 in a second direction is preferably 500 nm or more.

Meanwhile, in order to maximize capacitance per unit volume, and minimize a step difference between the insulating layers 151 and 152 and the stack portion 110, an average thickness t of the connection electrodes 141 and 142 in the second direction is preferably 3000 nm or less.

In this case, the average thickness t of the connection electrodes 141 and 142 may be a value obtained by averaging sizes, in the second direction of the connection electrodes 141 and 142 measured at ten points disposed at equal intervals, in the first direction, in a cross-section of the connection electrodes 141 and 142 taken in the first and second directions (cross-section in thickness-length directions) cut from a center thereof in the third direction (width direction).

Therefore, in an embodiment, the average thickness of the connection electrodes 141 and 142 in the second direction may satisfy 500 nm or more and 3000 nm or less, so that appropriate capacitance per unit volume may be secured and the step difference between the insulating layer and the stack portion may be minimized to prevent cracks, and connectivity between the internal electrode and the connection electrode may be improved.

Insulating layers 151 and 152 may be disposed on end surfaces of the connection electrodes 141 and 142 in the second direction, and may serve to improve sealing properties to minimize permeation of moisture, a plating solution, or the like, from the outside.

The insulating layers 151 and 152 may be disposed to cover both end surfaces of the stack portion 110 and the connection electrodes 141 and 142 in the second direction to improve sealing properties of the multilayer electronic component 1000. In this regard, the insulating layers 151 and 152 may be disposed to cover both end surfaces of the connection electrodes 141 and 142 in the second direction.

The insulating layers 151 and 152 may be formed of a barium titanate-based material, a lead composite perovskite-based material, or a strontium titanate-based material, but an embodiment thereof is not limited thereto. Since the insulating layers 151 and 152 do not contribute to capacitance formation like the dielectric layer 111, the insulating layers 151 and 152 are not necessarily formed of a material having high permittivity, and may include a material having excellent sealing properties, strength, and adhesion.

The insulating layers 151 and 152 may be formed in a transferring manner, similarly to the connection electrodes 141 and 142, and then may be subjected to a sintering process. In addition, the insulating layers 151 and 152 may be simultaneously fired together with the stack portion 110 and the connection electrodes 141 and 142.

The external electrodes 131 and 132 may be disposed on the body to be connected to the connection electrodes 141 and 142.

In addition, the external electrodes 131 and 132 may be connected to the lead portions 141b and 142b of the connection electrodes 141 and 142 in contact with at least one surface of the body 100.

Specifically, the first external electrode 131 may be in contact with the lead portion 141b of the first connection electrode 141 in contact with the first internal electrode 121 on at least one of the surfaces 1, 2, 5, and 6 of the body 100, and the second external electrode 132 may be in contact with the lead portion 142b of the second connection electrode 142 in contact with the second internal electrode 1221 on at least one of the surfaces 1, 2, 5, and 6 of the body 100.

Accordingly, the first internal electrode 121, the first connection electrode 141, and the first external electrode 131 may be electrically connected, and the second internal electrode 122, the second connection electrode 142, and the second external electrode 132 may be electrically connected.

Meanwhile, external electrodes may be disposed on the third and fourth surfaces 3 and 4 of the body 100 to which the lead portions 141b and 142b are not exposed. In this case, the external electrodes 131 and 132 may include a first external electrode 131 disposed on the third surface 3 and disposed to extend onto portions of the first, second, fifth, and sixth surfaces, and a second external electrode 132 disposed on the fourth surface 4 and disposed to extend onto portions of first, second, fifth, and sixth surfaces.

The external electrodes 131 and 132 may be formed of any material having electrical conductivity, such as a metal, and a specific material of each of the external electrodes 131 and 132 may be determined in consideration of electrical characteristics, structural stability, and the like. Furthermore, the external electrodes 131 and 132 may have a multilayer structure.

For example, the external electrodes 131 and 132 may include an electrode layer disposed on the body 100 and a plating layer formed on the electrode layer.

As a more specific example of the electrode layer, the electrode layer may be a sintered electrode including a conductive metal and glass or a resin-based electrode including a conductive metal or a resin.

In addition, the external electrodes 131 and 132 may have a form in which sintered electrodes and resin-based electrodes are sequentially formed on the body 100. In addition, the external electrodes 131 and 132 may be formed by a method of dipping a sheet including a conductive metal onto the body 100, or may be formed by a wheel method, but an embodiment thereof is not limited thereto.

As the conductive metal included in the external electrodes 131 and 132, a material having excellent electrical conductivity may be used, but is not particularly limited. For example, the conductive metal may be at least one of Cu, Ni, Pd, Ag, Sn, Cr, and alloys thereof.

Hereinafter, characteristics and shapes of connection electrodes 141, 141', and 141" of the multilayer electronic component according to an embodiment will be described in detail with reference to FIGS. 7A to 9F. In order to avoid overlap, the description will be based on the first connection electrode 141, but various embodiments may also be applied to the case of the second connection electrode 142.

In addition, the connection electrode according to FIGS. 7A to 9F of the present disclosure may be applied when lead portions 141$b$1, 141$b$2, 141$b$3, 141$b$4, 141$b$1', 141$b$2', 141$b$3', 141$b$4', and 141$b$" of the connection electrodes 141, 141', and 141" are formed to extend to any one of the first, second, fifth, and sixth surfaces of the body 100.

FIGS. 7A, 7B, 7C, 7D, and 7E are cross-sectional views illustrating a shape of a connection electrode of a multilayer electronic component according to an embodiment corresponding to the cross-section II-II' of FIG. 5. In a cross section of the body in the second direction of the body shown in FIGS. 7A, 7B, 7C, 7D, and 7E, the connection electrode may be spaced apart from corners of cross section.

Figure 7A:
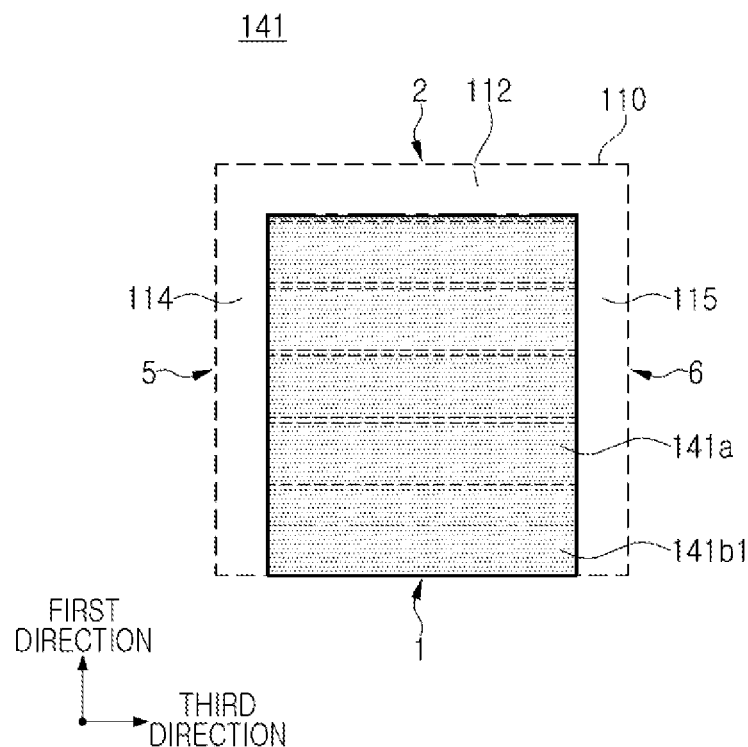
FIGS. 7A, 7B, 7C, 7D, and 7E are cross-sectional views illustrating a shape of a connection electrode of a multilayer electronic component according to an embodiment corresponding to a cross-section II-II' of FIG. 5.
Figure 7B:
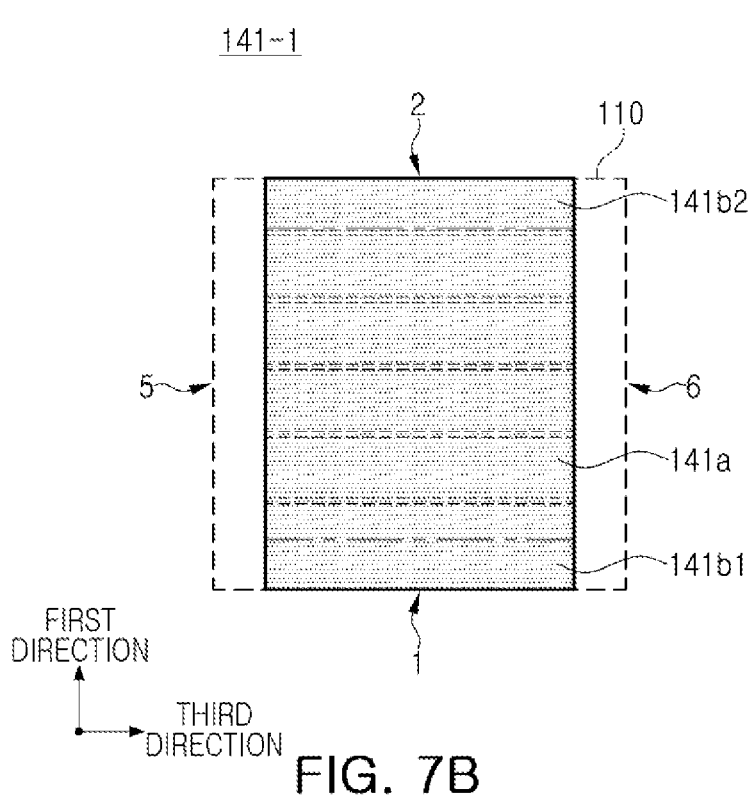

In an embodiment, referring to FIGS. 7A to 7B, the connection electrode 141 may include a body portion 141$a$ disposed to be in contact with one end of the internal electrodes 121 in the second direction on the end surface of the stack portion 110 in the second direction, and the connection electrode 141 may include at least one of a first lead portion 141$b$1 disposed to extend from the body portion 141$a$ to be in contact with the first surface 1, a second lead portion 141$b$2 disposed to extend from the body portion 141$a$ to be in contact with the second surface 2, a third lead portion 141$b$3 disposed to extend from the body portion 141$a$ to be in contact with the fifth surface 5, and a fourth lead portion 141$b$4 disposed to extend from the body portion 141$a$ to be in contact with the sixth surface 6.

Accordingly, since a size of the margin portions 114 and 115 in the second direction may be minimized in the second direction, a step difference in a compression process may also be minimized, and a phenomenon in which a thickness of an end of the dielectric layer 111 in the second direction is reduced may be suppressed. Accordingly, withstand voltage characteristic of the multilayer electronic component 1000 may be improved.

In addition, since the size of the margin portions 114 and 115 in the second direction may be minimized, a volume occupied by the capacitance formation portion Ac may be improved to improve capacitance per unit volume of the multilayer electronic component 1000.

In addition, since the size of the margin portions 114 and 115 in the second direction is minimized, a permeation path of external moisture may be minimized, thereby improving moisture-resistance reliability of the multilayer electronic component 1000.

In addition, a surface in which the connection electrodes 141 and 142 are connected to external electrodes 131 and 132 may be freely selected, so that a degree of freedom in mounting of the multilayer electronic component 1000 may be improved.

Referring to FIG. 7A, the connection electrode 131 of the multilayer electronic component 141 according to an embodiment may include a body portion 141$a$ disposed to be in contact with one end of the internal electrode 121 in the second surface on the end surface of the stack portion 110 in the second direction, and a first lead portion 141$b$1 disposed to extend from the body portion 141$a$ to be in contact with the first surface 1.

Referring to FIG. 7B, the connection electrode 141-1 of the multilayer electronic component according to an embodiment may include first and second lead portions 141$b$1 and 141$b$2 disposed to extend from the body portion 141$a$ to be in contact with the first and second surfaces 1 and 2. Accordingly, a contact area between the external electrode 131 and the connection electrode 141-1 may be increased to improve connectivity.

Figure 7C:
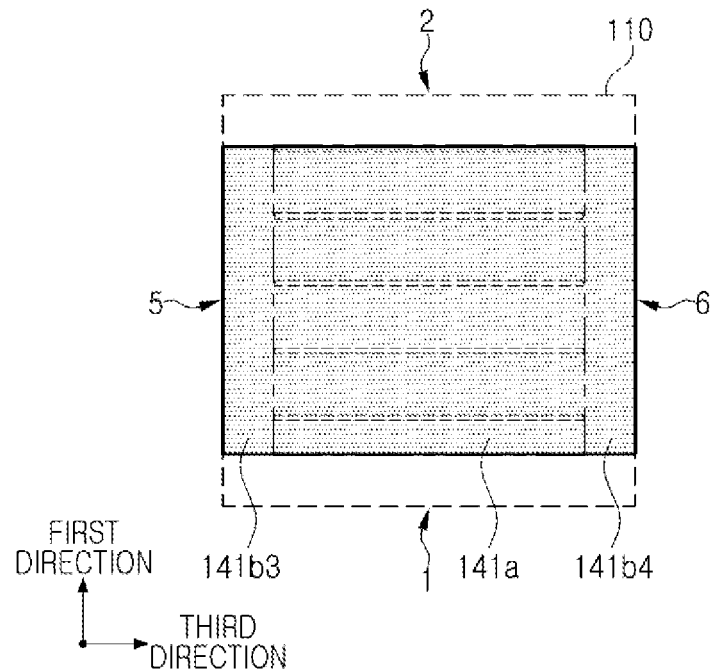

Referring to FIG. 7C, the connection electrode 141-2 of the multilayer electronic component according to an embodiment may include third and fourth lead portions 141$b$3 and 141$b$4 disposed to be in contact with the fifth and sixth surfaces, surfaces of the body opposing each other in a third direction, perpendicular to the first direction, a stacking direction from the body portion 141$a$. Accordingly, by forming an external electrode on the fifth or sixth surface thereof, vertical mounting can be facilitated.

Figure 7D:
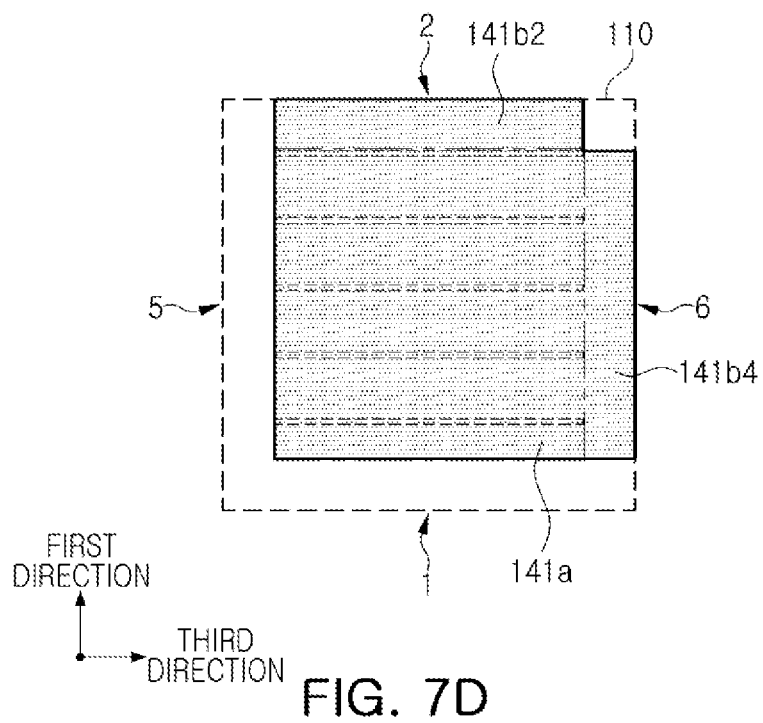

Referring to FIG. 7D, the connection electrode 141-3 of the multilayer electronic component according to an embodiment may include second and fourth lead portions 141$b$2 and 141$b$4 disposed to extend from the body portion 141$a$ to be in contact with the second and sixth surfaces. However, an embodiment thereof is not limited thereto, and may include a lead portion disposed to be in contact with two adjacent surfaces of the first, second, fifth, and sixth surfaces 1, 2, 5, and 6. Accordingly, by forming an external electrode on two adjacent surfaces of the body, a mounting direction may be freely selected.

Figure 7E:
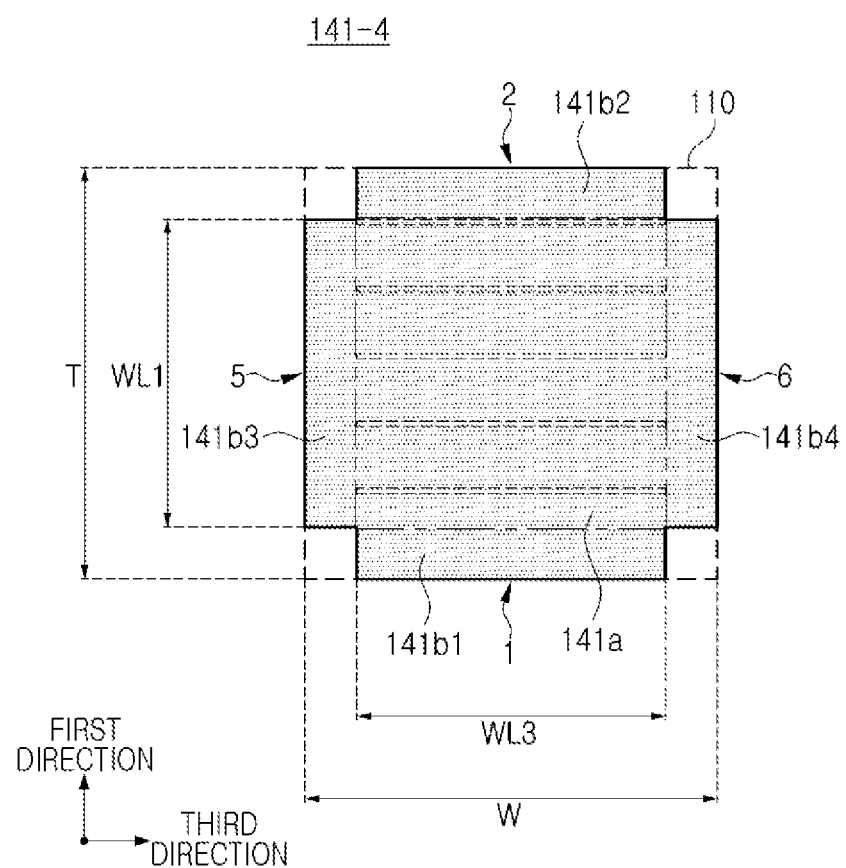

Referring to FIG. 7E, the connection electrode 141-4 of the multilayer electronic component according to an embodiment may include a first lead portion 141$b$1 disposed to extend from the body portion 141$a$ to be in contact with the first surface 1, a second lead portion 141$b$2 disposed to extend from the body portion to be in contact with the second surface 2, a third lead portion 141$b$3 disposed to extend from the body portion to be in contact with the fifth surface 5, and a fourth lead portion 141$b$4 disposed to extend from the body portion to be in contact with the second surface 6. Accordingly, connectivity between the connection electrode 141-4 and the external electrode 131 may be maximized.

In an embodiment, an average length WL3 of the first and second lead portions 141$b$1 and 141$b$2 in the third direction may be smaller than an average length W of the body in the third direction, and an average length WL1 of the second and fourth lead portions 141$b$2 and 141$b$4 in the third direction may be smaller than an average length T of the body in the first direction. In this case, the connection electrodes 141-4 may be disposed to cover only a portion of one end surface of the stack portion 110 in the second direction. Accordingly, moisture-resistance reliability may be improved compared to a case in which the connection electrode covers all of one end surface of the stack portion 110 in the second direction.

In an embodiment, a ratio WL3/W of the average length WL3 of the first and second lead portions 141$b$1 and 141$b$2 in the third direction to the average length W of the body in the third direction may be 0.1 or more and 0.8 or less.

In an embodiment, a ratio WL1/T of the average length WL1 of the third and fourth lead portions 141$b$3 and 141$b$4 in the first direction to the average length T of the body in the first direction may be 0.1 or more and 0.8 or less.

Accordingly, it is possible to improve the moisture-resistance reliability while securing the connectivity between the external electrode and the connection electrode.

The average length WL3 of the first and second lead portions 141b1 and 141b2 in the third direction and the average length W of the body in the third direction may be values obtained by polishing the insulating layer 151 in the second direction and exposing the connection electrode 141 and then, averaging sizes, in the third direction, measured at five arbitrary points, in the first direction, and the average length WL1 of the second and fourth lead portions 141b2 and 141b4 in the third direction and the average length T of the body in the first direction may be a value obtained by averaging sizes, in the first direction, measured at five arbitrary points, in the third direction. The measurement may be performed by a scanning electron microscope or an optical microscope. The present disclosure is not limited thereto. Other measurement methods or tools recognized by one of ordinary skill in the art may be also used.

FIGS. 8A, 8B, 8C, 8D, and 8E are cross sectional views illustrating a shape of a connection electrode of a multilayer electronic component according to an embodiment corresponding to the cross-section II-II' of FIG. 5. In a cross section of the body in the second direction of the body shown in FIGS. 8A, 8B, 8C, 8D, and 8E, the connection electrode may be spaced apart from corners of cross section.

Referring to FIGS. 8A to 8E, connection electrodes 141', 141'-1, 141'-2, 141'-3, and 141'-4 of the multilayer electronic component according to an embodiment may include at least one of a first lead portion 141b1' disposed to extend from the body portion 141a' to be in contact with the first surface 1, a second lead portion 141b2' disposed to extend from the body portion 141a' to be in contact with the second surface 2, a third lead portion 141b3' disposed to extend from the body portion 141a' to be in contact with the fifth surface 5, and a fourth lead portion 141b4' disposed to extend from the body portion 141a' to be in contact with the sixth surface 6, and an average length WL3' of the first and second lead portions 141b1' and 141b2' in the third direction may be smaller than an average length WB3' of the body portion 141a' in the third direction, and an average length WL1' of the second and fourth lead portions 141b3' and 141b4' in the first direction may be smaller than an average length WB1' of the body portion 141a' in the first direction. Accordingly, a region in which at least one of the lead portions 141b1', 141b2', 141b3' and 141b4' are exposed to the body may be minimized to secure moisture-resistance reliability, while securing connectivity between the internal electrode 121 and the connection electrode 141'.

In an embodiment, a ratio WL3'/WB3' of the average length WL3' of the first and second lead portions 141b1', 141b2 to the average length WB3' of the body portion 141a' in the third direction may be 0.1 or more and 0.8 or less.

In an embodiment, a ratio of the average length WL1' of the third and fourth lead portions 141b3' and 141b4' in the first direction to the average length WB1' of the body portion 141a' in the first direction may be 0.1 or more and 0.8 or less.

Accordingly, moisture-resistance reliability may be improved while securing the connectivity between the external electrode and the connection electrode.

Meanwhile, the average length WL3' of the first and second lead portions 141b1' and 141b2' in the third direction and the average length WB3' of the body portion 141a' in the third direction may be values obtained by polishing the insulating layer 151 in the second direction and exposing the connection electrode 141' and then, averaging sizes, in the third direction, measured at five arbitrary points, in the first direction, and the average length WL1' of the second and fourth lead portions 141b3' and 141b4' in the first direction and the average length WB1' of the body portion 141a' in the first direction may be a value obtained by averaging sizes, in the first direction, measured at five arbitrary points, in the third direction. The measurement may be performed by a scanning electron microscope or an optical microscope. The present disclosure is not limited thereto. Other measurement methods or tools recognized by one of ordinary skill in the art may be also used Referring to FIG. 8A, the connection electrode 141' of the multilayer electronic component according to an embodiment may include a body portion 141a' disposed to be in contact with one end of the internal electrode 121 in a second direction in an end surface of the stack portion 110 in the second direction, and a first lead portion 141b1' disposed to extend from the body portion 141' to be in contact with the first surface 1.

Figure 8A:
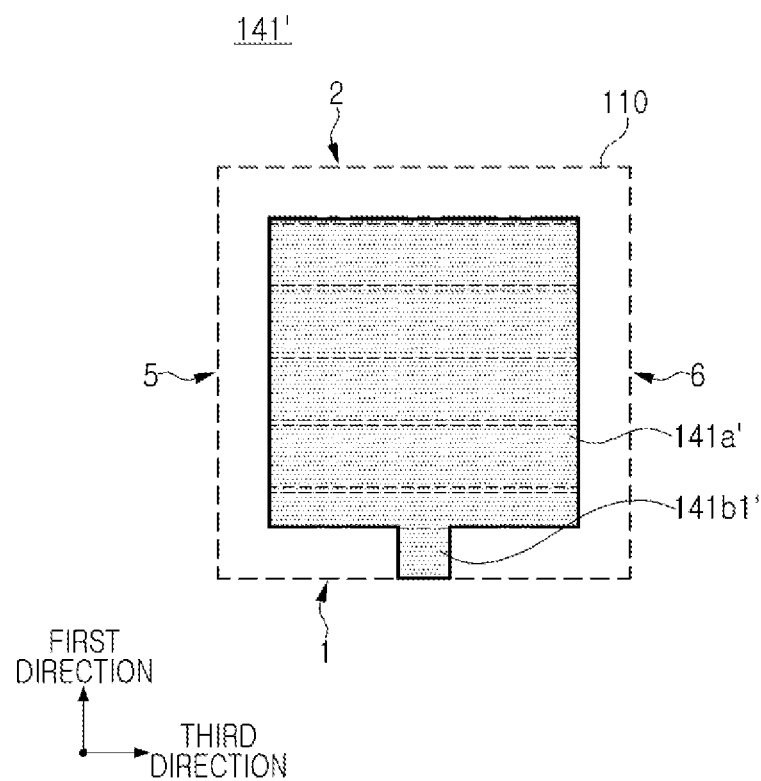
FIGS. 8A, 8B, 8C, 8D, and 8E are cross-sectional views illustrating a shape of a connection electrode of a multilayer electronic component according to an embodiment corresponding to a cross-section II-II' of FIG. 5.
Figure 8B:
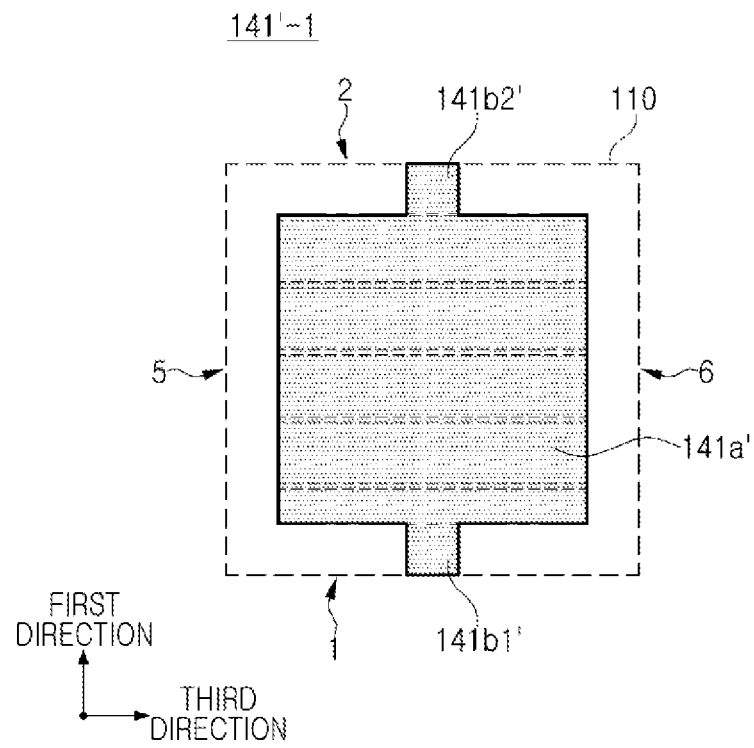

Referring to FIG. 8B, the connection electrode 141'-1 of the multilayer electronic component according to an embodiment may include first and second lead portions 141b1' and 141b2' disposed to extend from the body portion 141a' to be in contact with the first and second surfaces 1 and 2. When the average length WL3' of the first and second lead portions 141b1 and 141b2 in the third direction is smaller than the average length WB3' of the body portion 141a' in the third direction, connectivity between the external electrode and the lead portions 141b1' and 141b2' may become insufficient.

Accordingly, by allowing a lead portion having a small average length WL' in the third direction be in contact with the external electrode on at least two surfaces of the body, the connectivity between the external electrode and the lead portion may be improved.

Figure 8C:
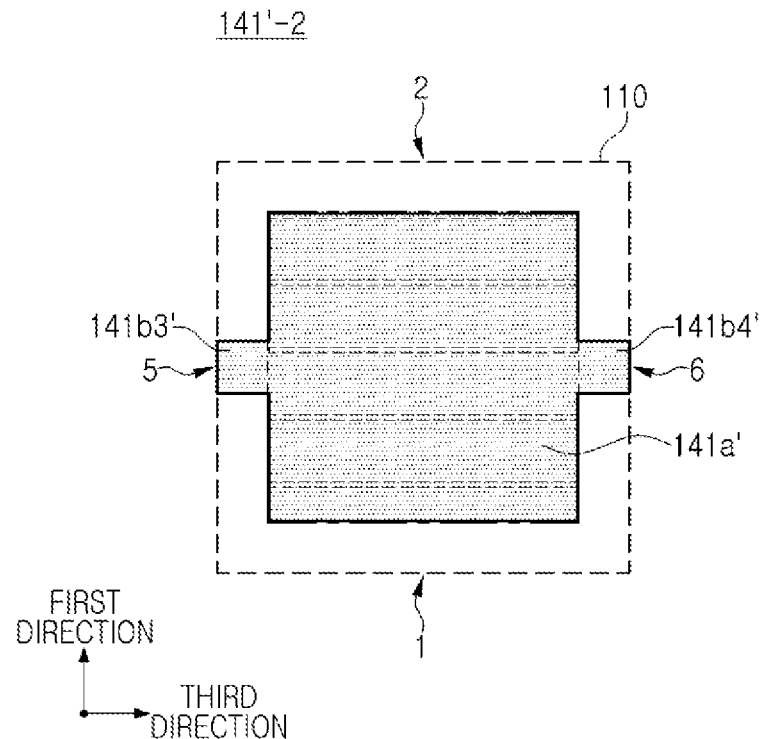

Referring to FIG. 8C, the connection electrode 141'-2 of the multilayer electronic component according to an embodiment may include third and fourth lead portions 141b3' and 141b4' disposed to be in contact with the fifth and sixth surfaces 5 and 6, surfaces of a body opposing each other in a third direction, perpendicular to the first direction, a stacking direction, from the body portion 141a'. Accordingly, by forming the external electrode on the fifth or sixth surface, vertical mounting may be facilitated.

Figure 8D:
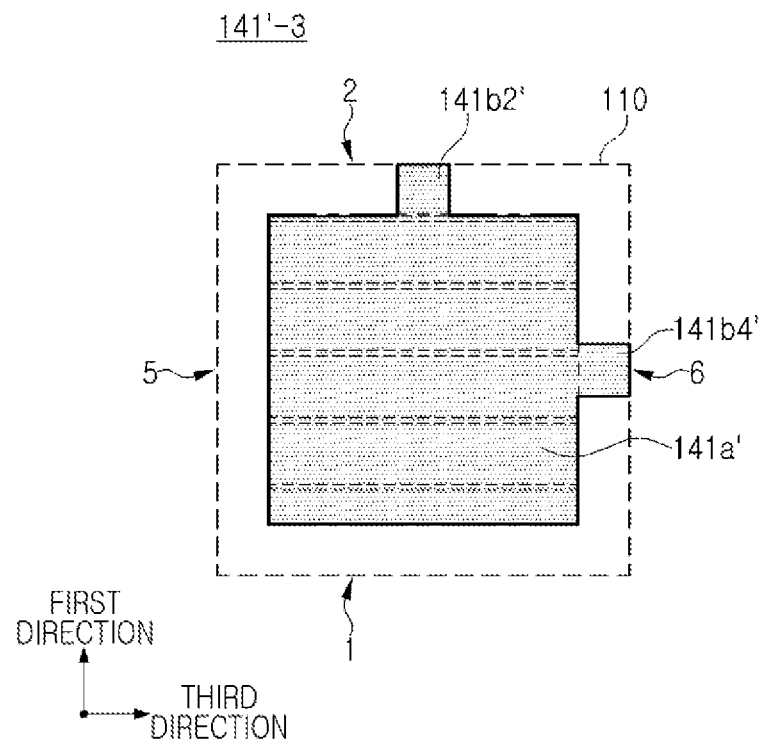

Referring to FIG. 8D, the connection electrodes 141'-3 of the multilayer electronic component according to an embodiment may include second and fourth lead portions 141b2' and 141b4' disposed to extend from the body portion 141a' to be in contact with the second and sixth surfaces 2 and 6. However, the present disclosure is not limited thereto, and may include a lead portion disposed to be in contact with two adjacent surfaces of the first, second, fifth, and sixth surfaces 1, 2, 5, and 6. Accordingly, by forming the external electrodes on two adjacent surfaces of the body, a mounting direction may be freely selected.

Figure 8E:
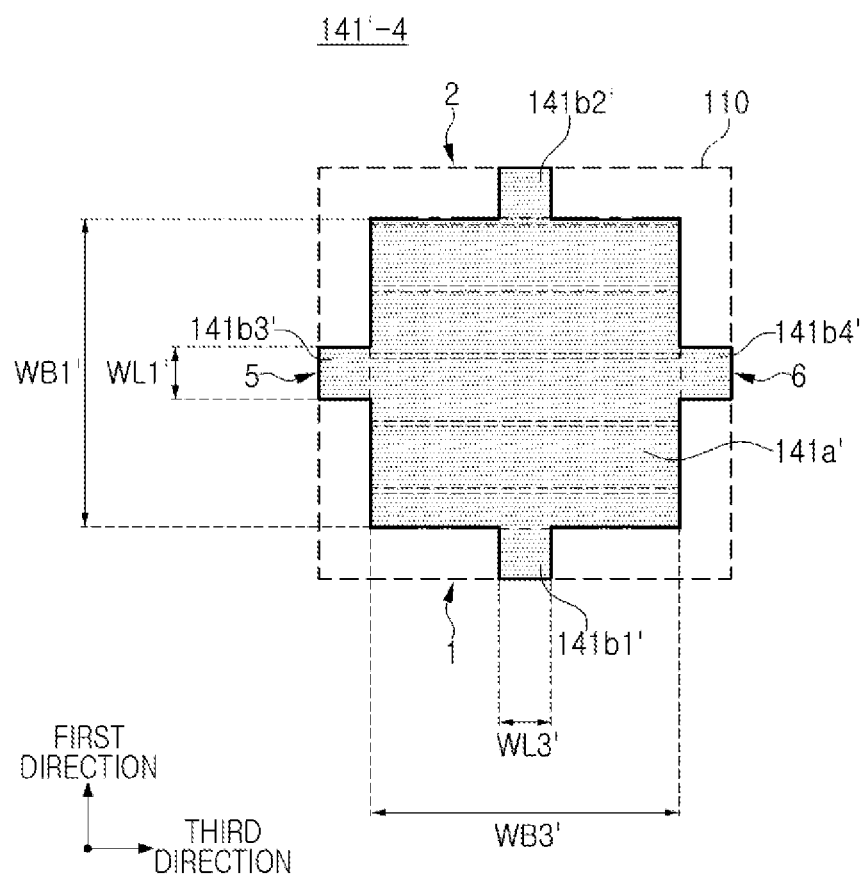

Referring to FIG. 8E, the connection electrode 141'-4 of the multilayer electronic component according to an embodiment may include a first lead portion 141b1' disposed to extend from the body portion 141a' to be in contact with the first surface 1, a second lead portion 141b2' disposed to extend from the body portion 141' to be in contact with the second surface 2, a third lead portion 141b3' disposed to extend from the body portion 141' to be in contact with the fifth surface 5, and a fourth lead portion 141b4' disposed to extend from the body portion 141' to be in contact with the sixth surface 6. Accordingly, the connectivity between the connection electrode 141'-4 and the external electrode 131 may be maximized.

In this case, the connection electrode 141'-4 may be disposed to cover only a portion of one end surface of the stack portion 110 in the second direction. Accordingly, moisture-resistance reliability may be improved compared to a case in which the connection electrode covers all of one end surface of the stack portion 110 in the second direction.

FIGS. 9A, 9B, 9C, 9D, 9E, and 9F are cross-sectional views illustrating a shape of a connection electrode of a multiple electronic component according to an embodiment corresponding to the cross-section II-II' of FIG. 5. In a cross section of the body in the second direction of the body shown in FIGS. 9A, 9B, 9C, 9D, 9E, and 9F, the connection electrode may be spaced apart from corners of cross section.

Referring to FIGS. 9A to 9F, a body portion 141a" of a connection electrode may be formed in plural, and each of the body portions may be disposed to be spaced apart from others thereof in a first direction or a third direction. When the plurality of body portions are disposed to be spaced apart from each other, there may be a problem in that electrical connectivity or adhesion between an internal electrode and a connection electrode may be reduced. However, as illustrated in FIGS. 9A to 9F, when the plurality of body portions 141a" are disposed to be spaced apart from each other in a first direction or a second direction at regular intervals in a form of three or more lines, since a contact area between the internal electrode and the connection electrode is increased, connectivity between the internal electrode and the connection electrode may be maximized.

The plurality of body portions preferably have a stripe shape in which a plurality of lines are disposed in parallel to improve the contact area between the internal electrode and the connection electrode to secure connectivity.

Figure 9A:
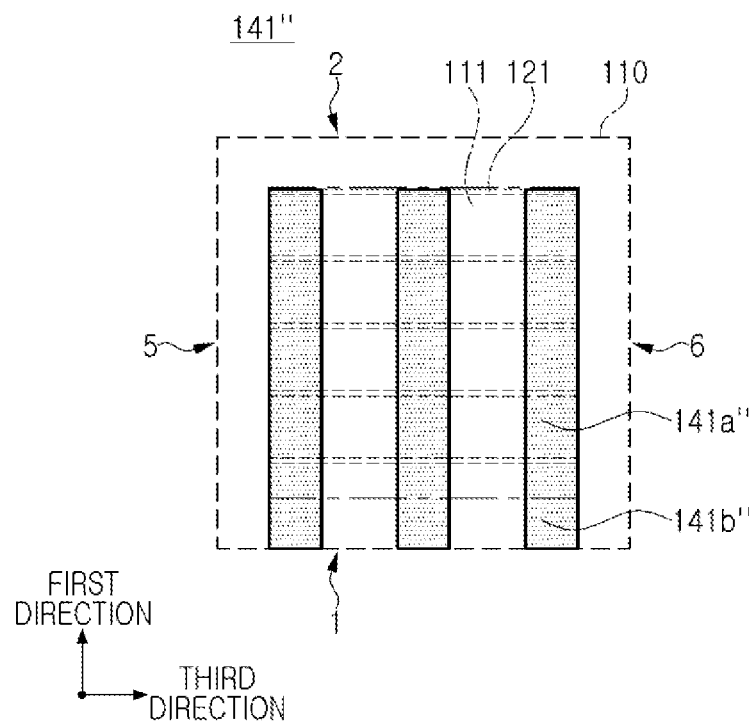
FIGS. 9A, 9B, 9C, 9D, 9E, and 9F are cross-sectional views illustrating a shape of a connection electrode of a multilayer electronic component according to an embodiment corresponding to a cross-section II-II' of FIG. 5.

Referring to FIG. 9A, a connection electrode 141" of the multilayer electronic component according to an embodiment may include a plurality of lead portions 141b" disposed to be in contact with one end of the internal electrodes 121 and 122 in a second direction, in an end surface of the stack portion 110 in the second direction, and disposed to extend from each of the plurality of body portions to be in contact with at least one of the first, second, fifth, and sixth surfaces 1, 2, and 6.

Accordingly, it is possible to minimize a path of external moisture permeation, thereby improving moisture resistance reliability, and since the plurality of body portions 141a" are disposed, the contact area between the internal electrode 121 and the connection electrode 141" may be improved to secure connectivity.

In an embodiment, the plurality of body portions 141a" may be three or more. When the plurality of body portions 141a" disposed to be spaced apart from each other are included, there is a concern that connectivity with the internal electrode 121 may be insufficient. In particular, when the connection electrodes 141 and 142 are formed by transferring a sheet-shaped metal layer to an end surface of the stack portion in the second direction without forming vias in the internal electrodes as in the embodiment the present disclosure, there is a high possibility that the connection between the internal electrodes 121 and 122 and the connection electrodes 141 and 142 is broken. Accordingly, by forming three or more of the plurality of body portions 141a", the connectivity between the internal electrodes 121 and 122 and the connection electrodes 141 and 142 may be improved.

Figure 9B:
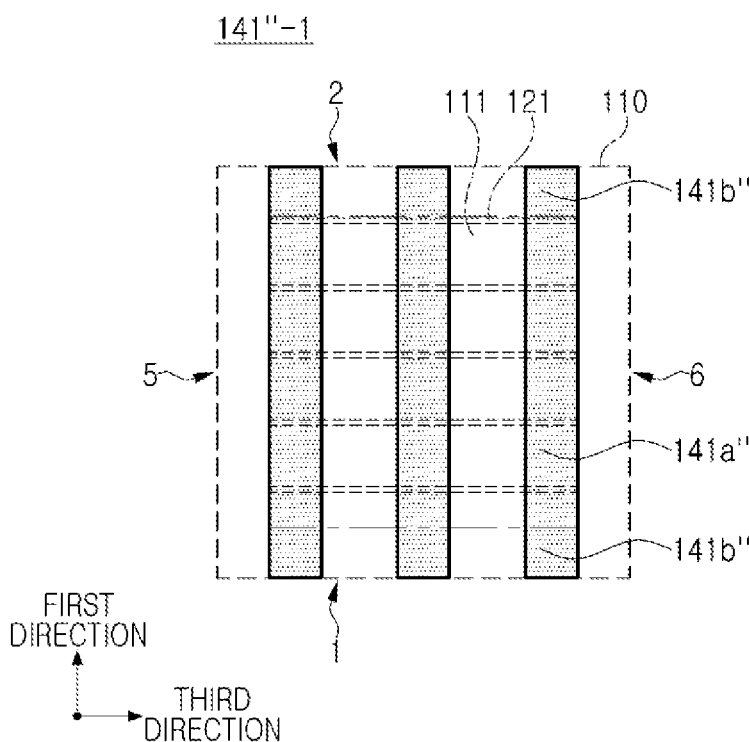

Referring to FIG. 9B, a connection electrode 141"-1 of the multilayer electronic component according to an embodiment may include a plurality of lead portions 141b" disposed to extend to be in contact with at least two surfaces of the first, second, fifth, and sixth surfaces 1, 2, 5, and 6. Accordingly, by allowing the external electrode and the lead portion 141b' to be in contact with each other on two or more surfaces, the connectivity between the connection electrode 141"-1 and the external electrode may be improved.

Figure 9C:
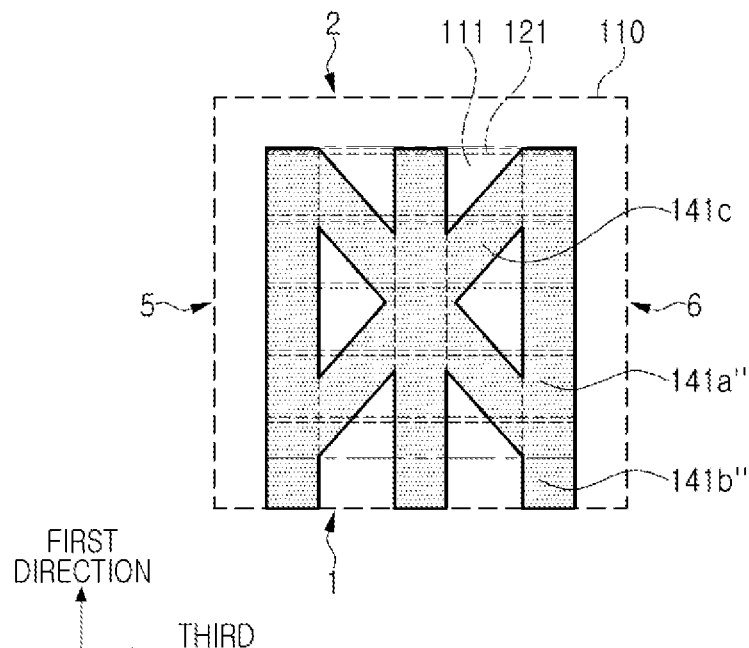

Referring to FIG. 9C, a connection electrode 142"-2 of the multilayer electronic component according to an embodiment may include a connection portion 141c connecting the plurality of body portions 141a".

When the connection electrode 142"-1 is disposed to be spaced apart from each other in a first direction or a third direction, there is a concern that connectivity may not be sufficient due to occurrence of partial short circuit with the internal electrode 121. Accordingly, by including a connection portion 141c for integrally connecting the plurality of body portions 141a" to the connection electrode 142"-2, the connectivity between the internal electrode 121 and the connection electrode 142"-2 may be secured.

Figure 9D:
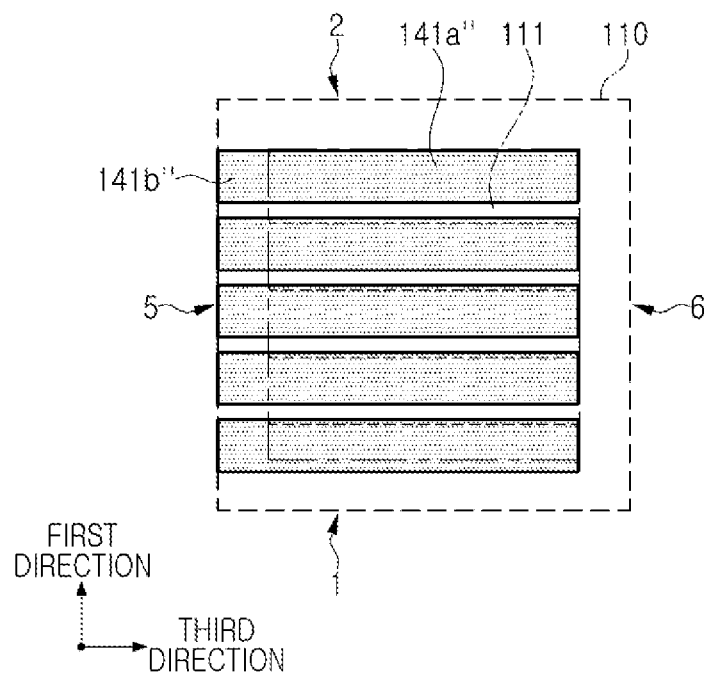

Referring to FIG. 9D, a connection electrode 141"-3 of the multilayer electronic component according to an embodiment may include a plurality of body portions 141a" disposed to be spaced apart from each other in the first direction. Accordingly, by forming an external electrode on the fifth or sixth surface, vertical mounting can be facilitated.

Figure 9E:
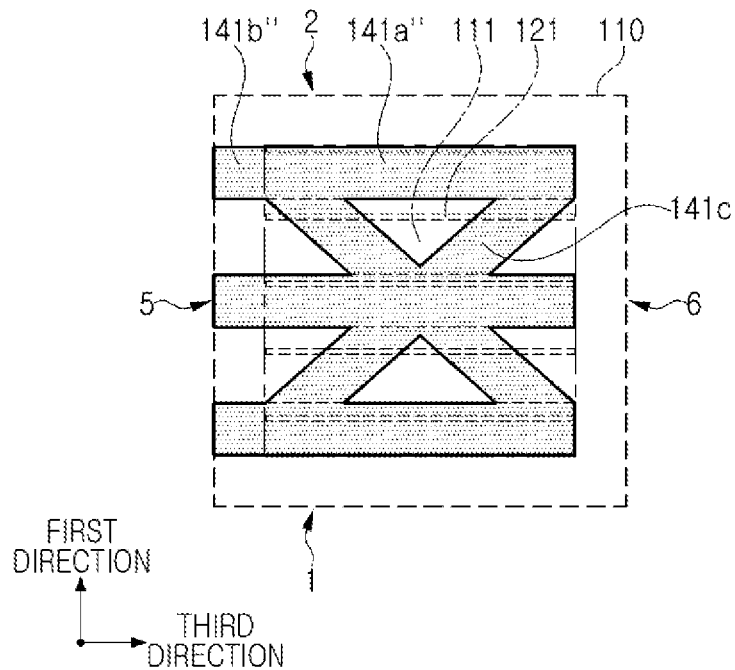

Referring to FIG. 9E, a connection electrode 141"-4 of the multilayer electronic component according to an embodiment may include a connection portion 141c for connecting a plurality of body portions 141a" disposed to be spaced apart from each other in the first direction.

When the plurality of body portions 141a" are disposed to be spaced apart in the first direction, a stacking direction, it is more likely not to be in contact with any one layer of the internal electrode 121 than when the plurality of body portions 141a" are disposed to be spaced apart from each other in the third direction. Accordingly, there is a concern electrical connectivity between a portion of the internal electrode 121 and the connection electrode 141"-4 is not secured, so that sufficient capacitance may not be secured.

Accordingly, by including a connection portion 141c connecting the plurality of body portions 141a" disposed to be spaced apart in the first direction, connectivity with all layers of the internal electrode 121 may be secured to secured to secure capacitance per unit volume of the multilayer electronic component. In this case, the connection portion 141c is preferably formed in all spaced spaces of the plurality of body portions 141a" spaced apart in a first direction.

Figure 9F:
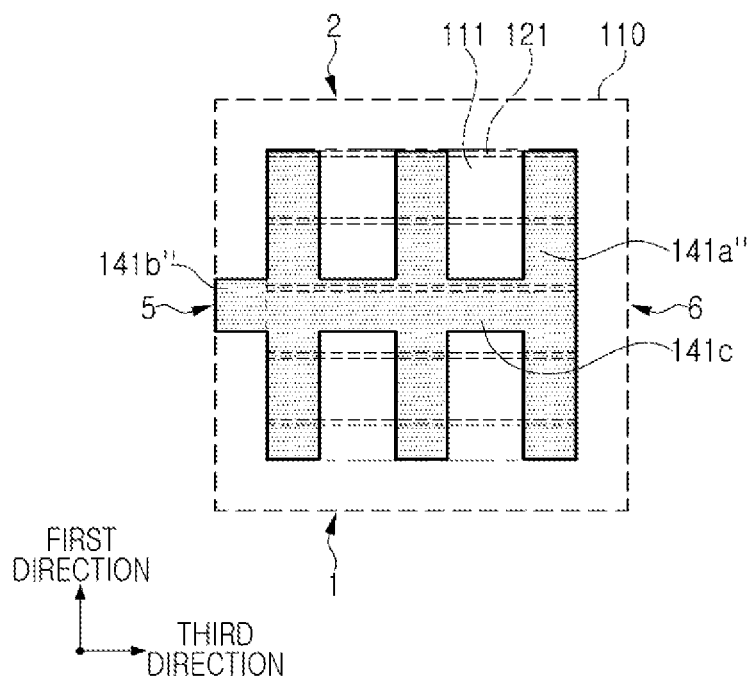

Referring to FIG. 9F, the connection electrode 141"-5 of the multilayer electronic component according to an embodiment may include a plurality of body portions 141a" spaced apart from each other in a third direction, and connection portion 141c formed in a third direction.

When the plurality of body portions 141a" are disposed to be spaced apart from each other in the third direction, unlike when disposed to be spaced apart from each other in the first direction, there is a low possibility that the connection electrode 141"-5 and the internal electrode 121 may not be connected. Accordingly, by including the connection portion 141c disposed in the third direction, a permeation path of external moisture may be further minimized, so that the moisture resistance reliability of the multilayer electronic component may be improved.

In this case, the lead portion 141b" may be disposed to be in contact with any one of the fifth and sixth surfaces, thereby extremely minimizing a permeation path of external moisture.

Hereinafter, characteristics of external electrodes of multilayer electronic components 1001, 1002, and 1003 according to an embodiment will be described in detail with reference to FIGS. 10 to 12.

Figure 10:
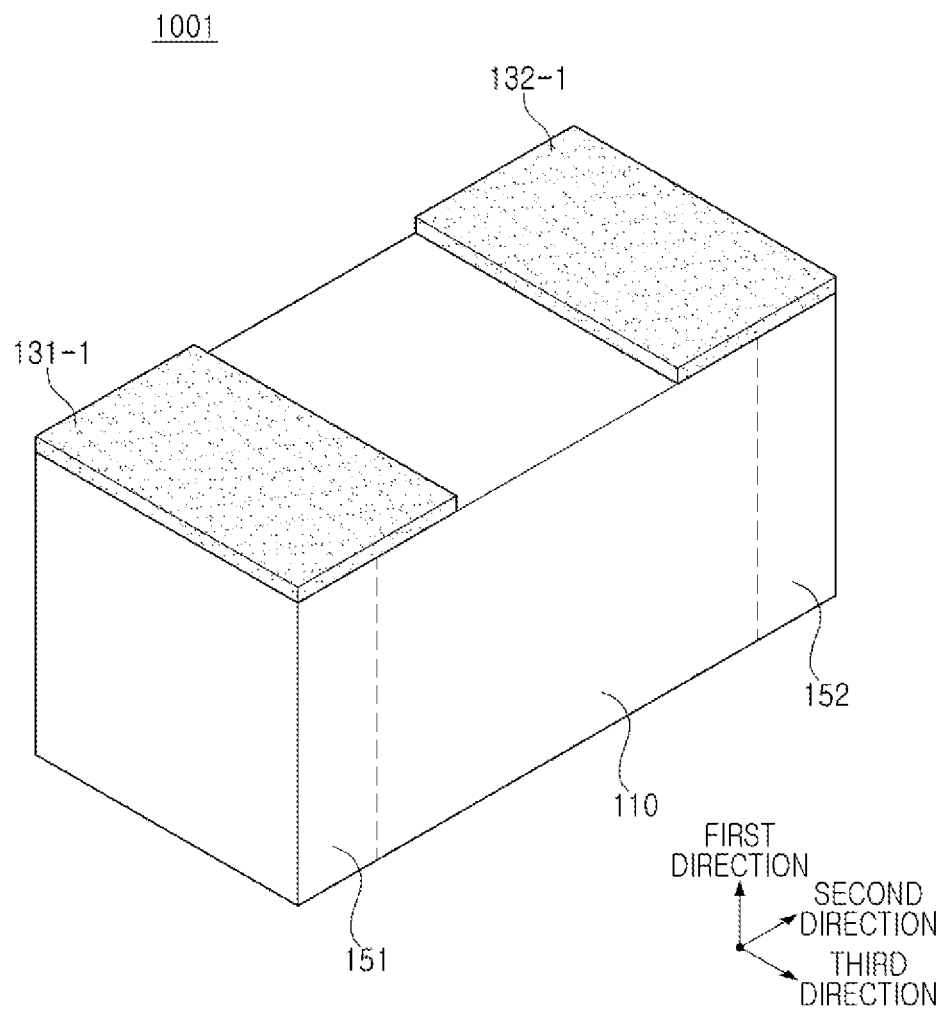
FIG. 10 is a perspective view schematically illustrating a multilayer electronic component according to an embodiment of the present disclosure.

FIG. 10 is a perspective view schematically illustrating a multilayer electronic component 1001 according to an embodiment of the present disclosure.

Referring to FIG. 10, a lead portion of the multilayer electronic component 1001 may be disposed to be in contact with a connection surface, one selected from the first, second, fifth, and sixth surfaces, and the external electrodes 131-1 and 132-1 may be disposed only on the connection surface to be in contact with the lead portion.

Accordingly, capacitance per unit volume of the multilayer electronic component 1001 may be improved by minimizing a volume occupied by the external electrodes.

In addition, when the external electrodes 131-1 and 132-1 are formed through a dipping process, since it is sufficient to perform the dipping process only on the connection surface, the process can be shortened.

Meanwhile, when the connection electrodes 141 and 142 include one or more of the first to fourth lead portions 141b1, 141b2, 141b3, and 141b4, one of the first to fourth lead portions may be disposed to be in contact with a connection surface, one selected from among the first, second, fifth, and sixth surfaces, and the external electrodes 131-1, and 132-1 may be disposed only on the connection surface to be in contact with one of the first to fourth lead portions.

Figure 11:
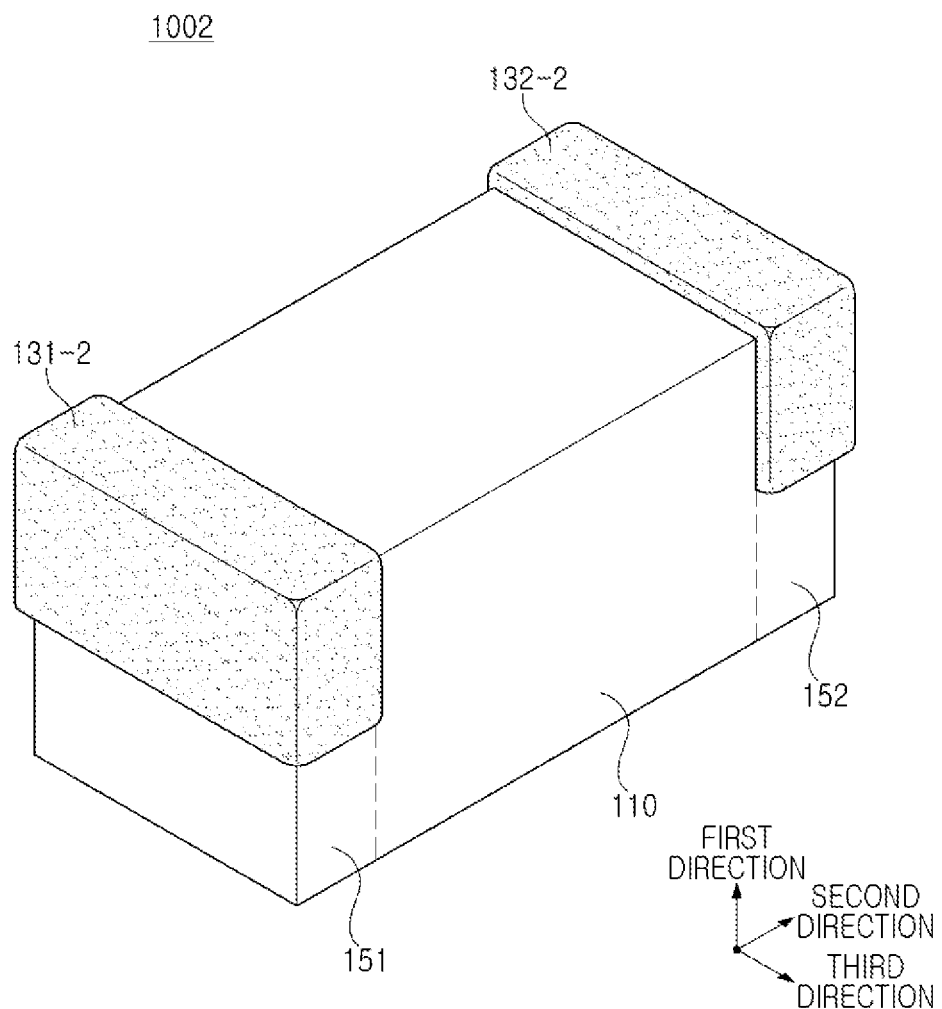
FIG. 11 is a perspective view schematically illustrating a multilayer electronic component according to an embodiment of the present disclosure.

FIG. 11 is a perspective view schematically illustrating a multilayer electronic component 1002 according to an embodiment of the present disclosure.

Referring to FIG. 11, a first external electrode 131-2 of the multilayer electronic component 1002 may be disposed on any one of the first and second surfaces 1 and 2 of the body 100 to be connected to a first connection electrode 141, and disposed to extend onto portions of the third, fifth, and sixth surfaces 3, 5, and 6, and a second external electrode 132-2 may be disposed on any one of the first and second surfaces 1 and 2 of the body 100 to be connected to a second connection electrode 142, and disposed to extend onto portions of the fourth, fifth, and sixth surfaces 4, 5, and 6.

Accordingly, when the multilayer electronic component 1002 is mounted on a substrate, a region in which a solder fillet is formed may be minimized, thereby reducing an occurrence rate (incidence) of a short circuit due to solder between the multilayer electronic components. Accordingly a gap between the mounted multilayer electronic components may be minimized, so that mounting density may be increased.

Figure 12:
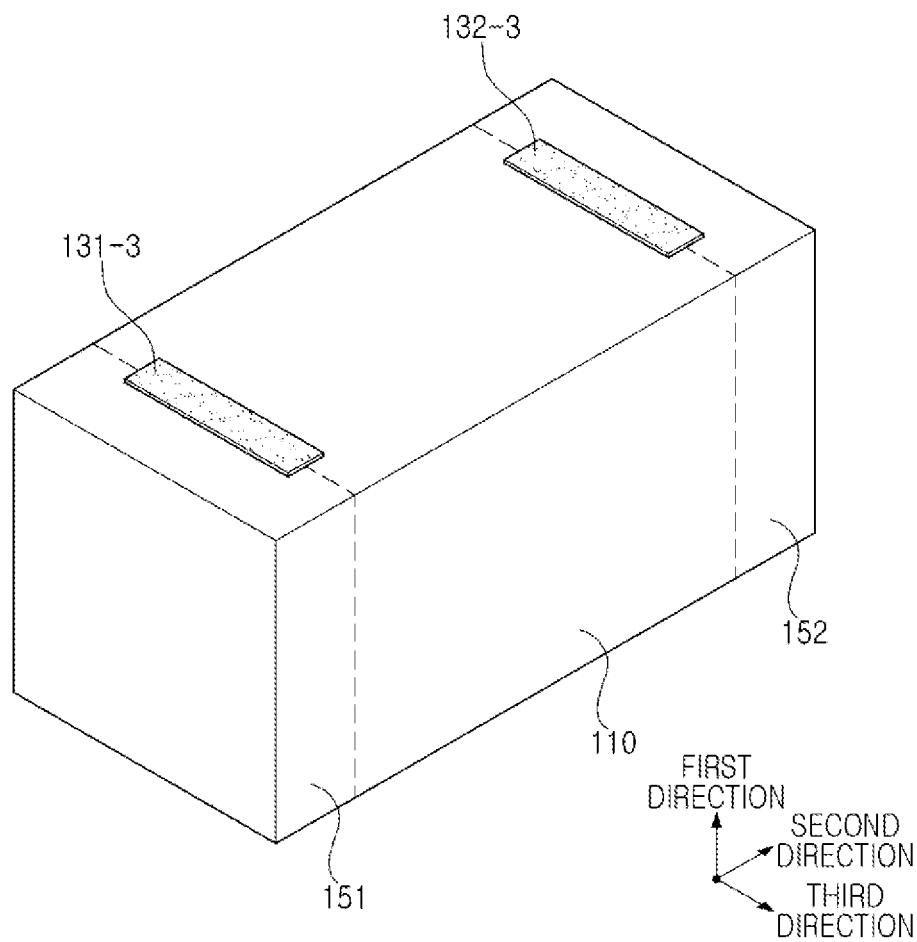
FIG. 12 is a perspective view schematically illustrating a multilayer electronic component according to an embodiment of the present disclosure.

FIG. 12 is a perspective view schematically illustrating a multilayer electronic component 1003 according to an embodiment of the present disclosure.

Referring to FIG. 12, the external electrodes 131-3 and 132-3 may be a plating layer covering ends of the lead portions 141b and 142b. Accordingly, a volume occupied by the external electrodes 131-3 and 132-3 may be minimized, so that capacity per unit volume of the multilayer electronic component 1003 may be further improved.

In this case, the external electrodes 131-3 and 132-3 may be disposed to cover a region to which lead portions 141b and 142b are exposed on one of the first and second surfaces of the body to which the lead portions 141b and 142b are exposed. That is, the external electrodes 131-3 and 132-3 may be disposed on only a portion of one of the first and second surfaces 1 and 2.

The external electrodes 131-3 and 132-3 may be disposed to cover the ends of the lead portions 141b and 142b exposed to the body, and may be disposed not to extend to an edge at which two of the first to sixth surfaces of the body 100 are in contact with each other.

In this case, the external electrodes 131-3 and 132-3 may be a plating layer formed by plating a conductive paste including metal particles and glass on the ends of the lead portions 141b and 142b exposed to the body, unlike by applying the conductive paste on the body and sintering the same. Accordingly, the external electrodes 131-3 and 132-3 may not include glass.

Meanwhile, the type of the external electrodes 131-3 and 132-3, the plating layer, is not particularly limited, and may be a plating layer including at least one of Ni, Sn, Pd, Cu, and alloys thereof, and may be formed of a plurality of layers.

Meanwhile, when the connection electrodes 141 and 142 include at least one of the first to fourth lead portions 141b1, 141b2, 141b3, and 141b4, the external electrodes 131-3 and 132-3 may be a plating layer covering an end of at least one of the first to fourth lead portions.

As set forth above, as one of the various effects of the present disclosure, capacitance per unit volume of the multilayer electronic component may be improved by minimizing a volume occupied by a margin portion in a second direction.

As one of the various effects of the present disclosure, moisture resistance reliability of the multilayer electronic component may be improved by minimizing a path of moisture permeation even when the volume occupied by the margin portion in the second direction is minimized in order to improve the capacity per unit volume of the multilayer electronic component.

As one of the various effects of the present disclosure, a degree of mounting freedom of an internal electrode and an external electrode may be improved through a connection electrode disposed in direction, perpendicular to a stacking direction.

However, various and beneficial advantages and effects of the present disclosure are not limited to the above, and will be more easily understood in the course of describing specific embodiments of the present disclosure.

In addition, the expression 'an embodiment' used in the present disclosure does not mean the same embodiment as each other, and is provided to emphasize and explain different unique features. However, an embodiment presented above is not excluded from being implemented in combination with the features of another embodiment. For example, even if a matter described in one specific embodiment is not described in another embodiment, it may be understood as a description related to another embodiment unless a description contradicts or contradicts the matter in another embodiment.

The terms used in the present disclosure are used to describe only one embodiment, and are not intended to limit the present disclosure. In this case, the singular expression includes the plural expression unless the context clearly indicates otherwise.

While example embodiments have been shown and described above, it will be apparent to those skilled in the art that modifications and variations could be made without departing from the scope of the present invention as defined by the appended claims.

What is claimed is:

1. A multilayer electronic component, comprising:
   a body including a stack portion in which a dielectric layer and first internal electrodes and second internal electrodes are alternately disposed in a first direction, a connection electrode disposed on an end surface of the stack portion in a second direction, perpendicular to the first direction, to be connected to the first internal electrodes, and an insulating layer disposed to cover an end surface of the connection electrode in the second direction, the body having first and second surfaces opposing each other in the first direction, third and fourth surfaces connected to the first and second surfaces and opposing each other in the second direction, and fifth and sixth surfaces connected to the first to fourth surfaces and opposing each other in a third direction, the stack portion including a capacitance formation portion in which the first internal electrodes and the second internal electrodes overlap each other in the first direction to form capacitance; and an external electrode disposed on the body and connected to the connection electrode, wherein the connection electrode includes a body portion in contact with one end of the first internal electrode in the second direction in the end surface of the stack portion in the second direction, the connection electrode further includes at least one of a first lead portion extending from the body portion to be in contact with the first surface, a second lead portion extending from the body portion to be in contact with the second surface, a third lead portion extending from the body portion to be in contact with the fifth surface, and a fourth lead portion extending from the body portion to be in contact with the sixth surface, an average length of the first and second lead portions in the third direction is shorter than an average length of the body portion in the third direction, an average length of the third and fourth lead portions in the first direction is shorter than an average length of the body portion in the first direction, and the capacitance formation portion and the connection electrode are spaced apart from each other.

2. The multilayer electronic component of claim 1, wherein the average length of the first and second lead portions in the third direction is shorter than an average length of the body in the third direction, and the average length of the third and fourth lead portions in the first direction is shorter than an average length of the body in the first direction.

3. The multilayer electronic component of claim 1, wherein an average thickness of the connection electrode in the second direction is 500 nm or more and 3000 nm or less.

4. The multilayer electronic component of claim 1, wherein the connection electrode comprises all of the first to fourth lead portions.

5. The multilayer electronic component of claim 1, wherein the external electrode comprises a first external electrode disposed on the third surface to extend onto portions of the first, second, fifth, and sixth surfaces, and a second external electrode disposed on the fourth surface to extend onto portions of the first, second, fifth, and sixth surfaces.

6. The multilayer electronic component of claim 1, wherein one of the first to fourth lead portions is in contact with a connection surface selected from among the first, second, fifth, and sixth surfaces, and the external electrode is disposed only on the connection surface to be in contact with the one of the first to fourth lead portions.

7. The multilayer electronic component of claim 1, wherein the external electrode comprises a first external electrode disposed on one of the first and second surfaces to be connected to the connection electrode, and extending onto portions of the third, fifth, and sixth surfaces, and a second external electrode disposed on another of the first and second surfaces of the body to be connected to another connection electrode disposed on another end surface of the stack portion in the second direction, and extending onto portions of the fourth, fifth, and sixth surfaces.

8. The multilayer electronic component of claim 1, wherein the external electrode includes a plating layer covering at least one end of the first to fourth lead portions.

9. A multilayer electronic component, comprising:

a body including a stack portion in which a dielectric layer and an internal electrode are alternately disposed in a first direction, a connection electrode disposed an end surface of the stack portion in a second direction, perpendicular to the first direction, to be connected to the internal electrode, and an insulating layer disposed to cover an end surface of the connection electrode in the second direction, the body having first and second surfaces opposing each other in the first direction, third and fourth surfaces connected to the first and second surfaces and opposing each other in the second direction, and fifth and sixth surfaces connected to the first to fourth surfaces and opposing each other in a third direction; and an external electrode disposed on the body and connected to the connection electrode, wherein the connection electrode includes a plurality of body portions being in contact with one end of the internal electrode in the second direction in the end surface of the stack portion in the second direction and spaced apart from each other such that a region between the plurality of body portions of the connection electrode is filled with a portion of the insulating layer, and one or more of lead portions extending from one or more of the plurality of body portions to be in contact with at least one of the first, second, fifth, and sixth surfaces, and the connection electrode protrudes in the second direction from the end surface of the stack portion such that the end surface of the connection electrode and at least one side surface of the connection electrode are in contact with the external electrode.

10. The multilayer electronic component of claim 9, wherein the connection electrode has an average thickness of 500 nm or more and 3000 nm or less in the second direction.

11. The multilayer electronic component of claim 9, wherein the connection electrode comprises a connection portion connecting the plurality of body portions.

12. The multilayer electronic component of claim 9, wherein the plurality of body portions are three or more.

13. The multilayer electronic component of claim 9, wherein the plurality of body portions are spaced apart from each other in the third direction.

14. The multilayer electronic component of claim 9, wherein the plurality of body portions are spaced apart from each other in the first direction.

15. The multilayer electronic component of claim 9, wherein the external electrode comprises a first external electrode disposed on the third surface and extending onto portions of the first, second, fifth, and sixth surfaces, and a second external electrode disposed on the fourth surface and extending onto portions of the first, second, fifth, and sixth surfaces.

16. The multilayer electronic component of claim 9, wherein the one or more lead portions are in contact with a connection surface selected from among the first, second, fifth, and sixth surfaces, and the external electrode is disposed only on the connection surface to be in contact with the lead portion.

17. The multilayer electronic component of claim 9, wherein the external electrode comprises a first external electrode disposed on one of the first and second surfaces and connected to the connection electrode, and extending onto portions of the third, fifth, and sixth surfaces, and a second external electrode disposed on another of the first and second surfaces of the body and connected to another connection electrode disposed on another end surface of the stack portion in the second direction, and extending onto portions of the fourth, fifth, and sixth surfaces.

18. The multilayer electronic component of claim 9, wherein the external electrode includes a plating layer covering an end of the lead portion.

19. A multilayer electronic component, comprising:
- a body including a stack portion in which a dielectric layer and first and second internal electrode are alternately disposed in a first direction, a first connection electrode disposed on a first end surface of the stack portion in a second direction, perpendicular to the first direction, to be connected to the first internal electrode, and a first insulating layer disposed to cover an end surface of the first connection electrode in the second direction, a second connection electrode disposed on a second end surface of the stack portion in the second direction to be connected to the second internal electrode, and a second insulating layer disposed to cover an end surface of the second connection electrode in the second direction, the body having first and second surfaces opposing each other in the first direction, third and fourth surfaces connected to the first and second surfaces and opposing each other in the second direction, and fifth and sixth surfaces connected to the first to fourth surfaces and opposing each other in a third direction; and
- a first external electrode disposed on the body to connect to the first connection electrode and a second external electrode disposed on the body to connect to the second connection electrode,
- wherein the first connection electrode includes a first body portion in contact with one end of the first internal electrode in a second direction perpendicular to the first direction, and a first lead portion extending from the first body portion to be in contact with one of the first surface, the second surface, the fifth surface, and the sixth surface,
- the second connection electrode includes a second body portion in contact with one end of the second internal electrode in the second direction, and a second lead portion extending from the body portion to be in contact with the one of the first surface, the second surface, the fifth surface, and the sixth surface,
- the first connection electrode protrudes in the second direction from the first end surface of the stack portion such that the end surface of the first connection electrode and at least one side surface of the first connection electrode are in contact with the first external electrode, and
- in a cross section of the body in the second direction of the body, the first connection electrode is spaced apart from corners of cross section.

20. The multilayer electronic component of claim 19, wherein the first lead portion extends from the first body portion to be in contact with two or more of the first surface, the second surface, the fifth surface, and the sixth surface.

21. The multilayer electronic component of claim 19, wherein the first lead portion extends from the first body portion to be in contact with each of the first surface, the second surface, the fifth surface, and the sixth surface.

22. The multilayer electronic component of claim 19, wherein an average thickness of the first connection electrode in the second direction is 500 nm or more and 3000 nm or less.

23. The multilayer electronic component of claim 19, wherein the first external electrode is disposed on the third surface to extend onto portions of the first, second, fifth, and sixth surfaces to connect to the first connection electrode.

24. The multilayer electronic component of claim 19, wherein the first external electrode is disposed on only one of the first and second surfaces to connect to the first connection electrode, and extending onto portions of the third, fifth, and sixth surfaces.

25. The multilayer electronic component of claim 19, wherein among the first to sixth surfaces, the first external electrode is disposed on only one of the first and second surfaces to connect to the first connection electrode.

* * * * *